US012748980B2

(12) United States Patent
Araki et al.

(10) Patent No.: US 12,748,980 B2
(45) Date of Patent: Sep. 29, 2026

(54) LEARNING DEVICE, LEARNING METHOD, AND STORAGE MEDIUM

(71) Applicant: NEC Corporation, Tokyo (JP)

(72) Inventors: Toshinori Araki, Tokyo (JP); Kazuya Kakizaki, Tokyo (JP); Inderjeet Singh, Tokyo (JP)

(73) Assignee: NEC Corporation, Tokyo (JP)

(*) Notice: Subject to any disclaimer, the term of this patent is extended or adjusted under 35 U.S.C. 154(b) by 475 days.

(21) Appl. No.: 18/387,901

(22) Filed: Nov. 8, 2023

(65) Prior Publication Data

US 2024/0160946 A1 May 16, 2024

(30) Foreign Application Priority Data

Nov. 10, 2022 (JP) ................................ 2022-180595

(51) Int. Cl.
*G06N 3/094* (2023.01)

(52) U.S. Cl.
CPC .................................... *G06N 3/094* (2023.01)

(58) Field of Classification Search
CPC ...................................................... G06N 3/094
See application file for complete search history.

(56) References Cited

U.S. PATENT DOCUMENTS

2022/0164670 A1 5/2022 Sun et al.

FOREIGN PATENT DOCUMENTS

JP 2021-005138 A 1/2021
WO 2022/038733 A1 2/2022
WO 2022/044425 A1 3/2022

OTHER PUBLICATIONS

Japanese Official Communication for JP Application No. 2022-180595, mailed on Jul. 21, 2026 with English Translation.

*Primary Examiner* — Young Lee
(74) *Attorney, Agent, or Firm* — Sughrue Mion, PLLC

(57) ABSTRACT

A learning device for a neural network uses the base data group to update a parameter value of the partial network and a parameter value of the normalization layer associated with the entire base data group, and uses each group of adversarial examples of each adversarial example generation condition to update the parameter value of the partial network and the parameter value of the normalization layer associated with the condition. The neural network includes a partial network, a normalization layer associated with the entirety of a base data group including a plurality of data, and a normalization layer associated with each condition of adversarial example generation.

9 Claims, 16 Drawing Sheets

LEARNING DEVICE, LEARNING METHOD, AND STORAGE MEDIUM

This application is based upon and claims the benefit of priority from Japanese patent application No. 2022-180595, filed on Nov. 10, 2022, the disclosure of which is incorporated herein in its entirety by reference.

TECHNICAL FIELD

The present disclosure relates to a learning device, a learning method, and a storage medium.

BACKGROUND ART

Adversarial examples (AX) may be used to train neural networks (see, for example, Japanese Unexamined Patent Application Publication No. 2021-005138).

SUMMARY

When adversarial examples are used to train a neural network, it is desirable to be able to reflect the diversity of the adversarial examples in the training.

An example of an object of the present disclosure is to provide a learning device, a learning method, and a storage medium that can solve the above-mentioned problems.

According to the first example aspect of the present disclosure, a learning device is provided with at least one memory configured to store instructions; and at least one processor configured to execute the instructions to: acquire a base data group, which is a group including a plurality of data; for each condition of adversarial example generation, use the data included in the base data group to acquire an adversarial data group, which is a group that includes two or more adversarial examples generated under that condition; and for a neural network that includes a partial network, a normalization layer associated with the entire base data group, and a normalization layer associated with each condition of adversarial example generation, each of these normalization layers normalizing the data input to the normalization layer itself using an average value and a variance value set for each normalization layer, update a parameter value of the partial network and a parameter value of the normalization layer associated with the entire base data group by using the base data group, and update the parameter value of the partial network and the parameter value of the normalization layer associated with the condition under which the adversarial example included in that adversarial data group is generated by using each adversarial data group.

According to the second example aspect of the present disclosure, a learning method includes a computer acquiring a base data group, which is a group including a plurality of data; using, for each condition of adversarial example generation, data included in the base data group to acquire an adversarial data group, which is a group that includes two or more adversarial examples generated under that condition; and for a neural network that includes a partial network, a normalization layer associated with the entire base data group, and a normalization layer associated with each condition of the generation of the adversarial example, each of these normalization layers normalizing the data input to the normalization layer itself using an average value and a variance value set for each normalization layer, updating a parameter value of the partial network and a parameter value of the normalization layer associated with the entire base data group by using the base data group, and updating the associated value of the partial network and the parameter value of the normalization layer associated with the condition under which the adversarial example included in that adversarial data group was generated by using each adversarial data group.

According to the third example aspect of the present disclosure, a non-transitory storage medium storing a program includes a program for causing a computer to: acquire a base data group, which is a group including a plurality of data; use, for each condition of adversarial example generation, data included in the base data group to acquire an adversarial data group, which is a group that includes two or more adversarial examples generated under that condition; and for a neural network that includes a partial network, a normalization layer associated with the entire base data group, and a normalization layer associated with each condition of the generation of the adversarial example, each of these normalization layers normalizing the data input to the normalization layer itself using an average value and a variance value set for each normalization layer, update a parameter value of the partial network and a parameter value of the normalization layer associated with the entire base data group by using the base data group, and update the associated value of the partial network and the parameter value of the normalization layer associated with the condition under which the adversarial example included in that adversarial data group is generated by using each adversarial data group.

According to the present disclosure, when adversarial examples are used to train neural networks, the diversity of the adversarial examples can be reflected in the training.

EXAMPLE EMBODIMENT

The following is a description of example embodiments of the disclosure, but the following example embodiments are not limiting to the claimed disclosure. Not all of the combinations of features described in the example embodiments are essential to the solution of the disclosure.

First Example Embodiment

Figure 1:
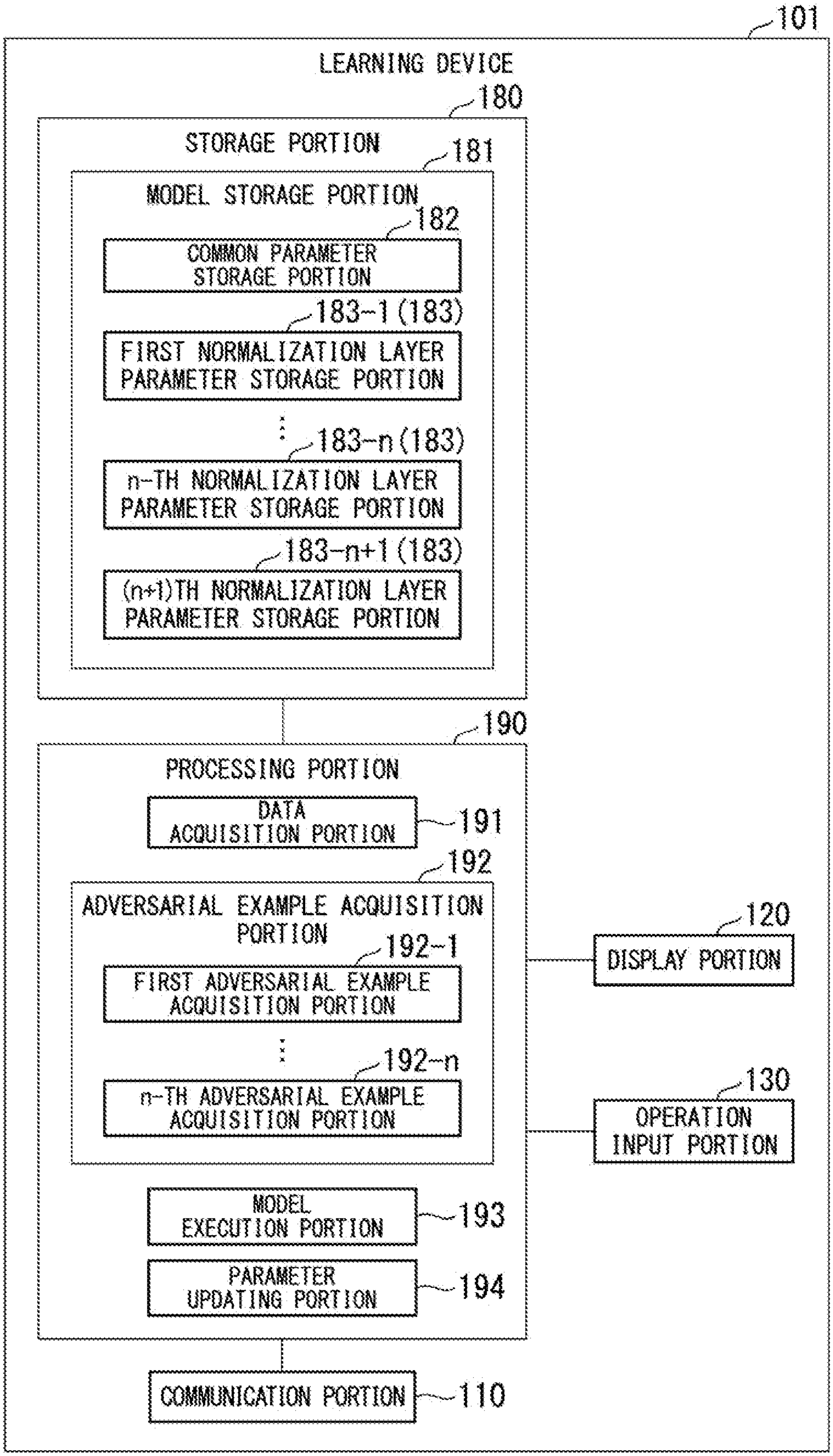
FIG. 1 is a diagram showing an example of the configuration of the learning device according to the first example embodiment.

FIG. 1 is a diagram showing an example of the configuration of the learning device according to the first example embodiment. In the configuration shown in FIG. 1, a learning device 101 is provided with a communication portion 110, a display portion 120, an operation input portion 130, a storage portion 180, and a processing portion 190. The storage portion 180 is provided with a model storage portion 181. The model storage portion 181 is provided with a common parameter storage portion 182 and a first normalization layer parameter storage portion 183-1 to an (n+1)th normalization layer parameter storage portion **183-*n*+1. Here, n is a positive integer. The processing portion 190 is provided with a data acquisition portion 191, an adversarial example acquisition portion 192, a model execution portion 193, and a parameter updating portion 194. The adversarial example acquisition portion 192 is provided with a first adversarial example acquisition portion 192-1 to an n-th adversarial example acquisition portion 192-*n***.

The first normalization layer parameter storage portion 183-1 to the (n+1)th normalization layer parameter storage portion **183-*n*+1 are collectively also denoted as normalization layer parameter storage portions 183**.

The learning device 101 learns neural networks. The learning device 101 may be configured using a computer, such as a personal computer (PC) or a workstation (WS).

The communication portion 110 communicates with other devices. For example, the communication portion 110 may receive data for neural network training from other devices. Further, for example, the communication portion 110 may receive from another device data in which the data intended for input to the neural network and the class to which the data is classified are linked.

The display portion 120 is provided with a display screen, such as a liquid crystal panel or light emitting diode (LED) panel, for example, and displays various images. For example, the display portion 120 may display information about the learning of the neural network, such as the progress of the neural network learning.

The operation input portion 130 is constituted by input devices such as a keyboard and mouse, for example, and receives user operations. For example, the operation input portion 130 may receive user operations for learning a neural network, such as input operations for the termination conditions of learning a neural network.

The storage portion 180 stores various data. The storage portion 180 is configured using the storage device provided by the learning device 101.

Figure 2:
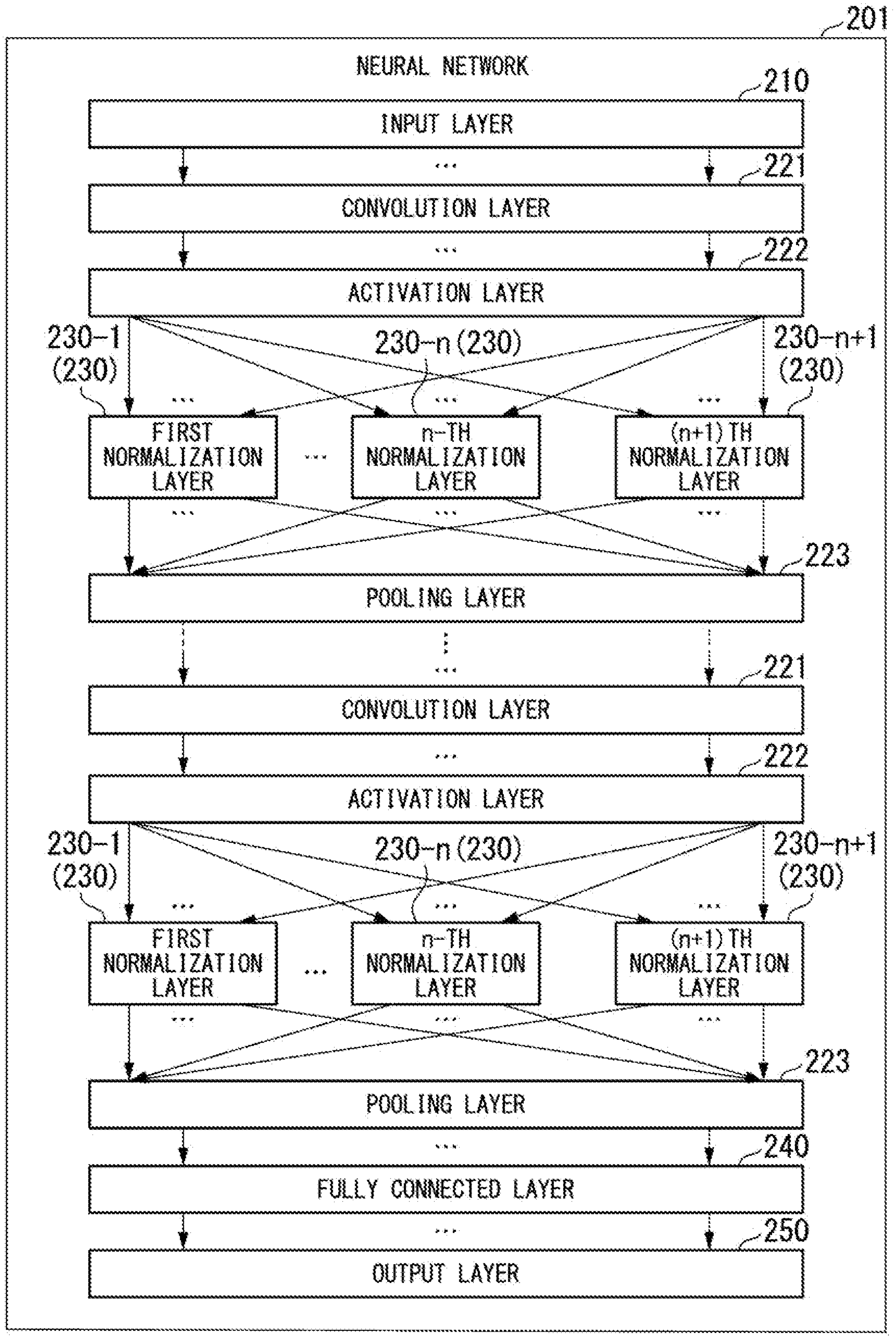
FIG. 2 is a diagram showing an example of a neural network stored by the model storage portion according to the first example embodiment.

The model storage portion 181 stores neural networks as machine learning models. FIG. 2 is a diagram showing an example of a neural network stored by the model storage portion 181. The neural network 201 shown in FIG. 2 is configured as a type of convolutional neural network (CNN) and includes an input layer 210, a convolution layer 221, an activation layer 222, a pooling layer 223, a first normalization layer 230-1 to an (n+1)th normalization layer **230-*n*+1, a fully connected layer 240, and an output layer 250**. As noted above, n is a positive integer. n represents the number of conditions for the generation of an adversarial example, which is discussed below.

The first normalization layer 230-1 through the (n+1)th normalization layers are also collectively denoted as normalization layers 230.

In the example in FIG. 2, one or more combinations of these layers are arranged in order from upstream in the data flow: the input layer 210 is followed by the convolution layer 221, the activation layer 222, and the pooling layer 223 in that order, and downstream of these layers are the fully connected layer 240 and the output layer 250.

The first normalization layer 230-1 to the (n+1)th normalization layer are placed in parallel between the activation layer 222 and the pooling layer 223 in each combination of the convolution layer 221, the activation layer 222, and the pooling layer 223.

The number of channels in the neural network 201 is not limited to a specific number.

The data for all channels from the activation layer 222 is input to each of the first normalization layer 230-1 to the (n+1)th normalization layer. Alternatively, the activation layer 222 may selectively output data to any one of the first normalization layer 230-1 to the (n+1)th normalization layer.

For the data output by each of the first normalization layer 230-1 through the (n+1)th normalization layer, the same channel data is combined and input to the pooling layer 223. For example, the sum of the data output by each of the first normalization layer 230-1 through the (n+1)th normalization layer may be input to the pooling layer 223. Alternatively, the data averaged over the data output by each of the first normalization layer 230-1 to the (n+1)th normalization layer may be input to the pooling layer 223.

Alternatively, if only any one of the first normalization layer 230-1 through the (n+1)th normalization layer obtains data from the activation layer 222, only the normalization layer 230 that obtained the data may output the data to the pooling layer 223.

The parts of the neural network 201 other than the normalization layers 230 are also referred to as common parts or partial network. In the case of the example in FIG. 2, the combination of the input layer 210, the convolution layer 221, the activation layer 222, the pooling layer 223, the fully connected layer 240, and the output layer 250 are examples of common parts.

The input layer 210 receives input data to the neural network 201.

The convolution layer 221 performs convolution operations on the data input to the convolution layer 221 itself. The convolution layer 221 may further perform padding to adjust the data size.

The activation layer 222 applies an activation function to the data input to the activation layer 222 itself. The activation function used by the activation layer 222 is not limited to a specific function. For example, a Normalized Linear Function (ReLU) may be used as the activation function, but is not limited thereto.

The pooling layer 223 performs pooling on data input to the pooling layer 223 itself.

Each of the normalization layers 230 normalizes the data input to the normalization layer 230 itself. The normalization here is the same as in Batch Normalization, where the normalization layer 230 transforms the data so that the average values and variance values of the data included in one group are the predetermined values.

For example, if the average value of one group of data is set to 0 and the variance value is set to 1, the normalization layer 230 calculates the average and variance values of the group of data being normalized, subtracts the average value from each data and divides the value after subtraction by the variance value.

The average value after normalization by the normalization layer 230 is not limited to 0, and the variance value is not limited to 1. For example, assuming α is a real number and β a positive real number, the normalization layer 230 may perform normalization such that the group's average value becomes a and the variance value is β. These values of α and β may also be subject to learning. The values of α and β may be set by learning for each normalization layer 230. In particular, the values of α and β may be set by learning for each of the multiple i-th normalization layers 230-*i* in the neural network 201, with i as an integer of $1 \le i \le n+1$.

The average value of the group targeted by the i-th normalization layer 230-*i* is also referred to as the i-th average value. The variance value of the group targeted by the i-th normalization layer 230-*i* is also referred to as the i-th variance value. The i-th average value and i-th variance value correspond to examples of parameter values of the i-th normalization layer 230-*i*. The parameter indicating the i-th average value is also referred to as the i-th average. The parameter indicating the i-th variance value is also referred to as the i-th variance.

When data for multiple channels is input to one normalization layer 230, that normalization layer 230 may be used to normalize the data for all data included in one group and for the all of the multiple channels. Alternatively, the normalization layer 230 may perform the data normalization on a per-channel basis.

In each of the first normalization layer 230-1 through the (n+1)th normalization layer 230-*n*+1, the data subject to learning of parameter values is different, as described below.

The fully connected layer 240 converts the data input to the fully connected layer 240 itself into data with the output data number of the neural network 201.

The output layer 250 outputs the output data of the neural network 201. For example, the output layer 250 may apply an activation function, such as a softmax function, to the data from the fully connected layer 240.

Alternatively, the fully connected layer 240 may generate output data for the neural network 201, and the output layer 250 may output the data from the fully connected layer 240 as is. In this case, the fully connected layer 240 may also function as the output layer 250, outputting data directly to the outside of the neural network 201.

However, the configuration of the machine learning model stored by the model storage portion 181 is not limited to a specific configuration.

For example, when the model storage portion 181 stores a convolutional neural network as a machine learning model, the configuration and number of layers of the convolutional neural network can be of various configurations and numbers. For example, the configuration of the machine learning model stored by the model storage portion 181 may be a combination of the convolution layer 221, activation layer 222, and pooling layer 223 included in the neural network 201 in the example in FIG. 2, without the activation layer 222.

The location where the combination from the first normalization layer 230-1 through the (n+1)th normalization layer 230-*n*+1 is provided is not limited to a specific location. For example, among the combinations of the convolution layer 221, the activation layer 222, and the pooling layer 223, combinations from the first normalization layer 230-1 to the (n+1)th normalization layer 230-*n*+1 may be provided for only a subset of these combinations.

The configuration of the machine learning model stored by the model storage portion 181 may consist of a convolutional neural network with batch normalization layers, with the number of batch normalization layers being n+1 and arranged in parallel.

However, the machine learning model stored by the model storage portion 181 is not limited to a convolutional neural network, and it can encompass various neural networks where normalization from the first normalization layer 230-1 to the (n+1)th normalization layer 230-*n*+1 can be applied.

The method of implementing the neural network subject to learning by the learning device 101 is not limited to the method in which the model storage portion 181 stores the neural network. For example, the neural network subject to learning by the learning device 101 may be implemented in hardware, such as through the use of an Application Specific Integrated Circuit (ASIC) or Field-Programmable Gate Array (FPGA).

The neural network subject to learning by the learning device 101 may be configured as part of the learning device 101, or it may be external to the learning device 101.

The common parameter storage portion 182 stores parameter values of the common parts. The common parameter storage portion 182 stores the values of various parameters to be learned, such as, for example, the filter for the convolution operation in the convolution layer and the parameters of the activation function in the activation layer.

The parameter values of the common parts are also referred to as common parameter values.

The i-th normalization layer parameter storage portion 183-*i* stores, for each i-th normalization layer 230-*i*, the parameter values for that i-th normalization layer 230-*i*. Here, i is an integer of $1 \le i \le n+1$. The i-th normalization layer parameter storage portion 183-*i* stores the values of various parameters subject to learning, such as the i-th average and i-th variance, for example.

The processing portion 190 controls the various parts of the learning device 101 to perform various processes. The functions of the processing portion 190 are performed, for example, by the CPU (central processing portion) provided by the learning device 101, which reads and executes the program from the storage portion 180.

The data acquisition portion 191 acquires a group that contains a plurality of data that are subject to input to the neural network 201 and to which information indicating the class of the correct answer in the class classification is associated. The data acquisition portion 191 corresponds to an example of a data acquisition means.

The data acquired by the data acquisition portion 191, which is the subject of input to the neural network 201, is also referred to as the base data. A group of base data is also referred to as a base data group. The number of base data groups acquired by the data acquisition portion 191 can be one or more, and is not limited to a specific number. When the data acquisition portion 191 acquires multiple groups of base data, the number of base data in each group may be the same or different.

The data acquisition portion 191 may acquire the base data from other devices via the communication portion 110.

The data acquisition portion 191 may also acquire base data from other devices in the form of base data groups. Alternatively, the data acquisition portion 191 may acquire base data from other devices and group them together into base data groups.

The adversarial example acquisition portion 192 acquires an adversarial data group, which is a group including multiple adversarial examples for data included in the base data group acquired by the data acquisition portion 191. Here, an adversarial example for a given data is an adversarial example in which an adversarial perturbation is added to the data.

The adversarial example acquisition portion 192 corresponds to an example of an adversarial example acquisition means.

The first adversarial example acquisition portion 192-1 to the n-th adversarial example acquisition portion **192-*n*** generate adversarial examples under different conditions. As noted above, n represents the number of conditions for the generation of an adversarial example.

The conditions for generating an adversarial example are not limited to any particular condition, as different conditions can be used to generate different adversarial examples. For example, the conditions for generating an adversarial example may include, but are not limited to, an algorithm for generating an adversarial example, quantitative parameters relating to generation of an adversarial example, target class, or a combination of these.

Here, if an adversarial example is intended to be misclassified into a certain class, that class (the class to which it is misclassified) is also referred to as the target class. In addition to data indicating the correct class, data indicating the target class may also be attached to the adversarial example.

Examples of algorithms for generating adversarial examples include, but are not limited to, the Fast Gradient Descent Method, the Carlini-Wagner Method, and the Projected Gradient Descent Method. Additionally, as conditions for the adversarial example generation algorithm, distinctions such as dodging attack and target attack may be used to classify the algorithms.

Examples of quantitative parameters relating to the generation of adversarial examples include, but are not limited to, the number of times noise (adversarial perturbation) is added, the amount of noise added per time, and the number of target classes discussed below.

A condition regarding which class is set as the target class can be used as a condition regarding the target class.

For example, the first adversarial example acquisition portion 192-1 to the n-th adversarial example acquisition portion **192-*n* may each generate adversarial examples using different algorithms. Alternatively, some of the first adversarial example acquisition portion 192-1 to n-th adversarial example acquisition portion 192-*n*** may use the same algorithm, each with a different number of noise additions.

Each of the first adversarial example acquisition portion 192-1 to the n-th adversarial example acquisition portion **192-*n* may apply the adversarial example generation method to the base data acquired by the data acquisition portion 191 to generate an adversarial example. Alternatively, each of the first adversarial example acquisition portion 192-1 to the n-th adversarial example acquisition portion 192-*n* may acquire adversarial examples from a device generating the adversarial examples via the communication portion 110**.

The number of adversarial examples in an adversarial data group may be the same as or different from the number of base data in the base data group.

When each of the first adversarial example acquisition portion 192-1 to the n-th adversarial example acquisition portion **192-*n* generates adversarial examples from the base data, they may generate the adversarial examples one by one from all the base data in one base data group and then consolidate them into one adversarial data group. Alternatively, each of the first adversarial example acquisition portion 192-1 to the n-th adversarial example acquisition portion 192-*n* may generate one adversarial example from some of the base data included in one base data group and consolidate them into one adversarial data group. Alternatively, each of the first adversarial example acquisition portion 192-1 to the n-th adversarial example acquisition portion 192-*n*** may generate adversarial examples from the base data contained in each of the plurality of base data groups and consolidate them into one adversarial data group.

Each of the first adversarial example acquisition portion 192-1 to the n-th adversarial example acquisition portion **192-*n* may generate multiple adversarial examples from a single base data. For example, when the conditions for generating adversarial examples are based on algorithm differences, one or more of the first adversarial example acquisition portion 192-1 to the n-th adversarial example acquisition portion 192-*n*** may generate multiple adversarial examples using the same algorithm by varying the number of times noise is added.

The model execution portion 193 executes the machine learning model stored by the model storage portion 181. Specifically, the model execution portion 193 inputs data to the neural network 201 and calculates the output data of the neural network 201. The calculation of output data by the neural network 201 is also referred to as estimation using neural network 201, or simply estimation.

The neural network 201 may output an estimate of the class into which the input data is classified. In this case, the neural network is also referred to as categorical AI.

Alternatively, the neural network 201 may output features of the input data. The neural network in this case is also referred to as feature-extraction AI.

The parameter updating portion 194 learns the neural network 201 and updates the parameter values of the neural network 201. The parameter updating portion 194 updates the parameter values of the partial network and the parameter values of the (n+1)th normalization layer **230-*n*+1 using the base data group. The parameter updating portion 194 also updates the parameter values of the partial network and the parameter values of the j-th normalization layer 230**-*j* using the adversarial data group acquired by the j-th adversarial example acquisition portion 192-*j*. Here, j is an integer of 1≤j≤n.

Similar to updating parameters in mini-batch learning, the parameter updating portion 194 may update parameter values using the average value of the plurality of input data in each part of the neural network 201 for multiple input data.

The parameter updating portion 194 corresponds to an example of a parameter updating means.

As mentioned above, data may be input to each of the first normalization layer 230-1 to the (n+1)th normalization layer 230-*n*+1. Alternatively, the data may be selectively input to any one of the first normalization layer 230-1 to the (n+1)th normalization layer 230-*n*+1.

When each data of the base data group (base data) is input to the neural network 201, the data of all channels from the activation layer 222, which outputs the data to the normalization layer 230, is input to each from the first normalization layer 230-1 to the (n+1)th normalization layer 230-*n*+1, or may be input to only the (n+1)th normalization layer among these.

When each data (adversarial example) of the adversarial data group acquired by the j-th adversarial example acquisition portion 192-*j* is input to the neural network 201, the data of all channels from the activation layer 222, which outputs the data to the normalization layer 230, may be input to each to each from the first normalization layer 230-1 to the (n+1)th normalization layer 230-*n*+1, or may be input to only the j-th normalization layer 230-*j* among these.

The method by which the parameter updating portion 194 updates parameter values is not limited to a specific method. The parameter updating portion 194 may update parameter values using known methods applicable to mini-batch learning, such as error back-propagation.

Figure 3:
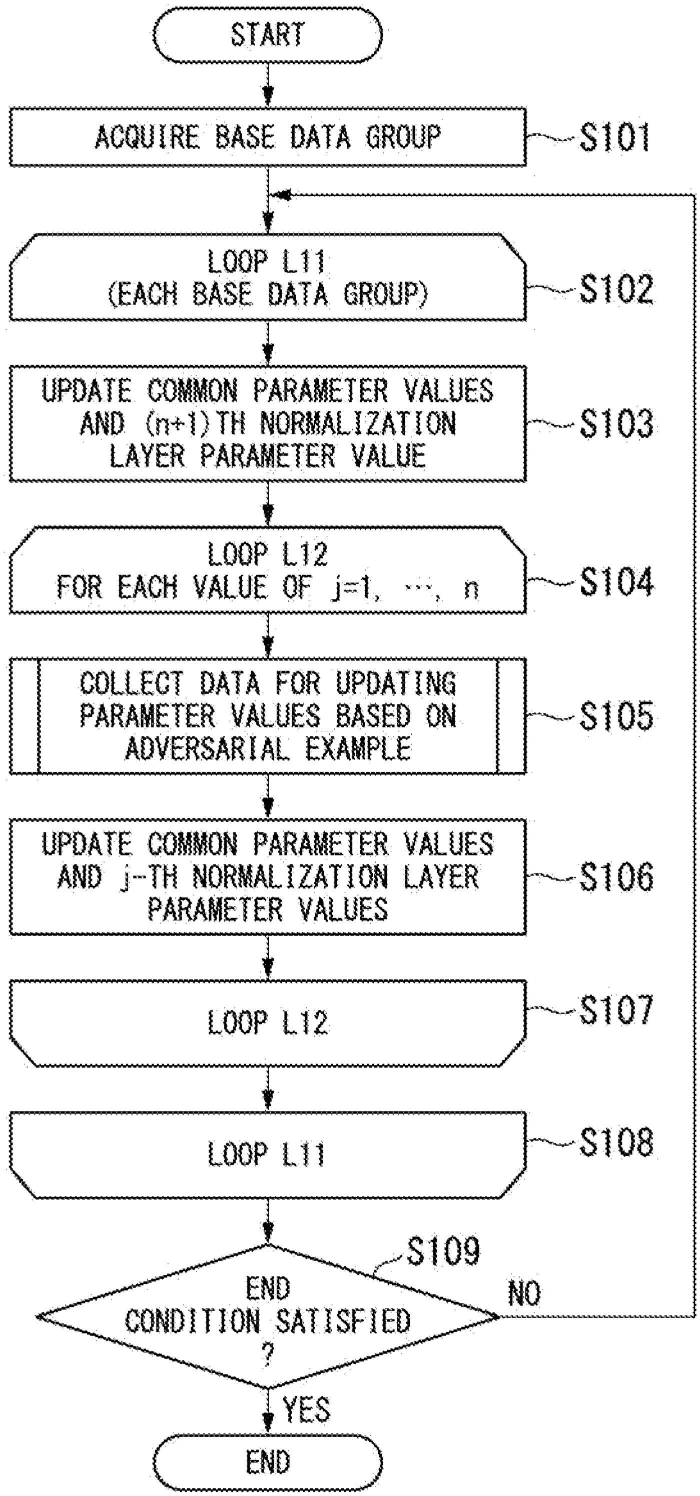
FIG. 3 is a diagram showing an example of the procedure in which the processing portion according to the first example embodiment learns a neural network.

FIG. 3 shows an example of the procedure in which the processing portion 190 trains a neural network 201.

In the process shown in FIG. 3, the data acquisition portion 191 acquires a base data group (Step S101). In other words, the data acquisition portion 191 acquires base data organized into groups. The data acquisition portion 191 may acquire base data organized into groups in advance. Alternatively, the data acquisition portion 191 may acquire the base data and group them together into base data groups.

Next, the processing portion 190 starts loop L11, which processes each group of base data (Step S102). The base data group that is the target of processing in loop L11 is also referred to as the target base data group.

In the process of loop L11, the parameter updating portion 194 updates the parameter values of the common parts and the parameter value of the (n+1)th normalization layer using the target base data group (Step S103).

Next, the processing portion 190 starts a loop L12 that performs processing for each of j=1, . . . , n (Step S104). j is used as an index that identifies from the first adversarial example acquisition portion 192-1 to the n-th adversarial example acquisition portion 192-*n*, and an index that identifies from the first normalization layer 230-1 to the n-th normalization layer 230-*n*.

Next, the processing portion 190 collects data to update the parameter values of the common parts and the parameter value of the j-th normalization layer 230-*j* (Step S105). The data for updating the parameter values of the common parts and the parameter value of the j-th normalization layer 230-*j* are also referred to as data for updating parameter values based on an adversarial example.

Next, the parameter updating portion 194 updates the parameter values of the common parts and the parameter values of the j-th normalization layer using the data obtained in Step S105 (Step S106).

Next, the processing portion 190 performs the termination of the loop L12 (Step S107).

Specifically, the processing portion 190 determines whether or not the processing of the loop L12 has been performed for all values of j=1, . . . , n. For example, the processing portion 190 increments the value of j from j=1 by 1, and determines whether or not the processing of the loop L12 has been performed for j=n.

In the second and subsequent iterations of the loop L12, the processing portion 190 determines whether or not the processing of the loop L12 has been performed for all values of j=1, . . . , n in that iteration.

If the processing portion 190 determines that there is a value of j for which the processing of the loop L12 has not yet been performed, the processing returns to Step S104. In this case, the processing portion 190 continues performing the processing of loop L12 for the value of j for which the processing of the loop L12 has not been performed by, for example, increasing the value of j by 1.

On the other hand, if it is determined that the loop L12 has been processed for all values of j=1, . . . , n, the processing portion 190 terminates the loop L12.

When the loop L12 is completed, the processing portion 190 performs the termination of the loop L11 (Step S108).

Specifically, the processing portion 190 determines whether or not the processing of the loop L11 has been performed for all the base data groups obtained in Step S101. In the second and subsequent iterations of the loop L11, the processing portion 190 determines whether or not the processing of the loop L11 has been performed for all the base data groups obtained in Step S101 in that iteration.

If the processing portion 190 determines that there is a base data group for which the processing of the loop L11 has not yet been performed, processing returns to Step S102. In this case, the processing portion 190 continues to perform the processing of the loop L11 for the base data group that has not been processed in the loop L11.

On the other hand, if it is determined that the processing of the loop L11 has been performed for all the base data groups obtained in Step S101, the processing portion 190 ends the loop L11.

When the loop L11 is completed, the processing portion 190 determines whether the conditions for termination of learning have been met (Step S109). Various conditions can be used to complete the learning here. For example, the condition for completion of the learning may be, but is not limited to, the condition that the processing from Step S102 to Step S109 has been repeated a predetermined number of times.

If the processing portion 190 determines that the conditions for completion of the learning have not been met (Step S109: NO), the process returns to Step S102. In this case, the processing portion 190 repeats the updating of the parameter values of the neural network 201 by repeating the process of the loop L11.

On the other hand, if the condition for completion of the learning is determined to be satisfied (Step S109: YES), the processing portion 190 completes the processing in FIG. 3.

Figure 4:
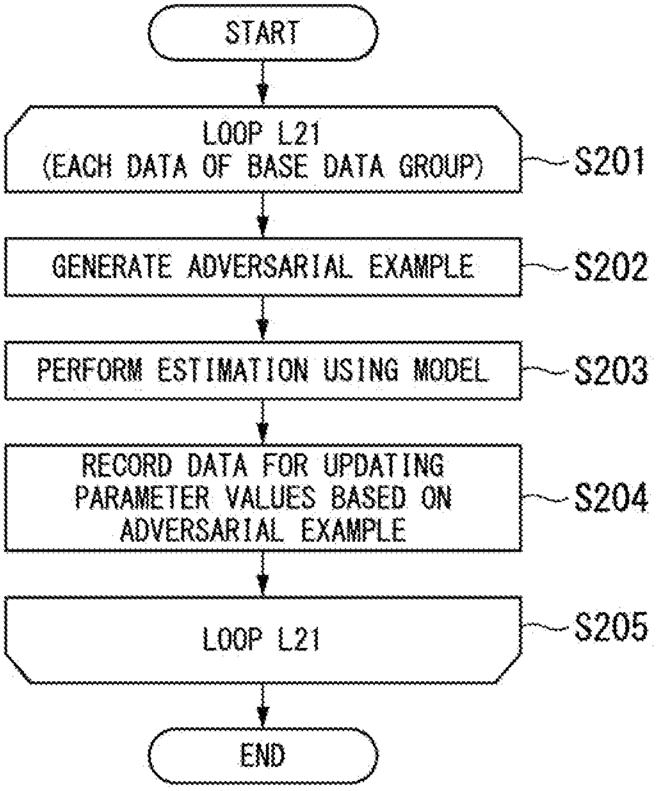
FIG. 4 is a diagram showing an example of the procedure in which the processing portion according to the first example embodiment collects data for updating parameter values based on adversarial examples.

FIG. 4 is a diagram that shows an example of the procedure in which processing portion 190 collects data for updating parameter values based on the adversarial example. The processing portion 190 performs the processing of FIG. 4 in Step S105 of FIG. 3.

In the process shown in FIG. 4, the processing portion 190 starts a loop L21, which processes each base data included in the target base data group (Step S201). The base data that is subject to processing in loop L21 is also referred to as the target base data.

In the process of loop L21, the j-th adversarial example acquisition portion 192-*j* generates an adversarial example for the target base data (Step S202). Here, j represents the index j in the loop L12 of FIG. 3.

Next, the model execution portion 193 inputs the adversarial example obtained in Step S202 to the neural network 201 and performs estimation using the neural network 201 (Step S203).

Next, the parameter updating portion 194 stores the data for updating parameter values based on the adversarial example in the storage portion 180 (Step S204).

For example, when using a learning method based on the error of data calculated by each part of the neural network 201, such as the error back-propagation method, the parameter updating portion 194 may calculate the error in each part of the neural network 201 that is subject to updating of the parameter value and store it in the storage portion 180. In this case, the parameter updating portion 194 calculates the average value of the errors stored by the storage portion 180 for each part of the neural network 201 in Step S106 of FIG. 3, and updates the parameter values by applying the learning method to the calculated average value.

Next, the processing portion 190 performs the termination of the loop L21 (Step S205).

Specifically, the processing portion 190 determines whether or not the processing of the loop L21 has been performed for all the base data included in the target base data group. In the second and subsequent iterations of the loop L12 (FIG. 3), the processing portion 190 determines whether or not the processing of the loop L21 has been performed for all base data included in the target base data group in that iteration.

If the processing portion 190 determines that there is base data for which the processing of the loop L21 has not yet been performed, processing returns to Step S201. In this case, the processing portion 190 continues to perform the loop L21 for the base data that has not been processed in the loop L21.

On the other hand, if it is determined that the processing of the loop L21 has been performed for all the base data included in the target base data group, the processing portion 190 ends the loop L21.

When the loop L21 is ended, the processing portion 190 ends the process in FIG. 4.

As described above, the data acquisition portion 191 acquires one or more base data groups, which are groups containing multiple data. For each condition of adversarial example generation, the adversarial example acquisition portion 192 uses the data included in the base data group to acquire one or more adversarial data groups, which are groups containing two or more adversarial examples generated under that condition. The parameter updating portion 194 uses the base data group to update the parameter values of the sub-network and the parameter values of the normalization layers associated with the entire base data group for the neural network 201, and uses each adversarial data group to update the parameter values of the sub-network and the parameter values of the normalization layers associated with the conditions under which the adversarial examples included in that adversarial data group are generated. The neural network 201 includes a partial network, a normalization layer associated with the entire base data group, and a normalization layer associated with each condition of generation of an adversarial example, with each of these normalization layers normalizing the data input to the normalization layer itself using the average value and variance value set for each normalization layer.

Thus, the neural network 201 is provided with the normalization layer 230 for each adversarial example generation condition, and the learning device 101 uses an adversarial data group including adversarial examples generated under each adversarial example generation condition to learn the parameter values of the partial network and the parameter values of the normalization layer 230 associated with that condition. According to the learning device 101, in this regard, when adversarial examples are used to train neural networks, the diversity of the adversarial examples can be reflected in the training.

Here, an adversarial example, which is created by a small perturbation, can be viewed as an input intended to induce error in a neural network, and adversarial examples can be used to train a neural network in order to improve the accuracy of the neural network. In other words, an adversarial example could be used as training data to compensate for the weakness of the neural network by training the neural network to be able to make accurate predictions on error-prone data.

In order to effectively train the neural network, a normalization layer, such as batch normalization, could be added to adjust the distribution of the data. When both the base data group and the adversarial data group are used to train a neural network, the distribution of data differs between the base data group and the adversarial data group for training the neural network, so a normalization layer may be provided for each to improve the efficiency of the training.

In addition, the learning device 101 learns the neural network 201 using the base data group and the adversarial data group for each condition of the generation of adversarial examples. The distribution of adversarial examples included in the adversarial data group differs for each condition of adversarial example generation.

In the learning device 101, in terms of learning the parameter values of the common parts and the parameter values of the normalization layer 230 for each condition of generation of adversarial examples, it is expected that the neural network 201 can be trained in response to differences in the distribution of data according to the diversity of the adversarial examples, and the learning can be performed efficiently.

Second Example Embodiment

The second example embodiment describes an example configuration of a learning device when the adversarial example acquisition portion generates adversarial data groups using an algorithm with a variable number of target classes.

Figure 5:
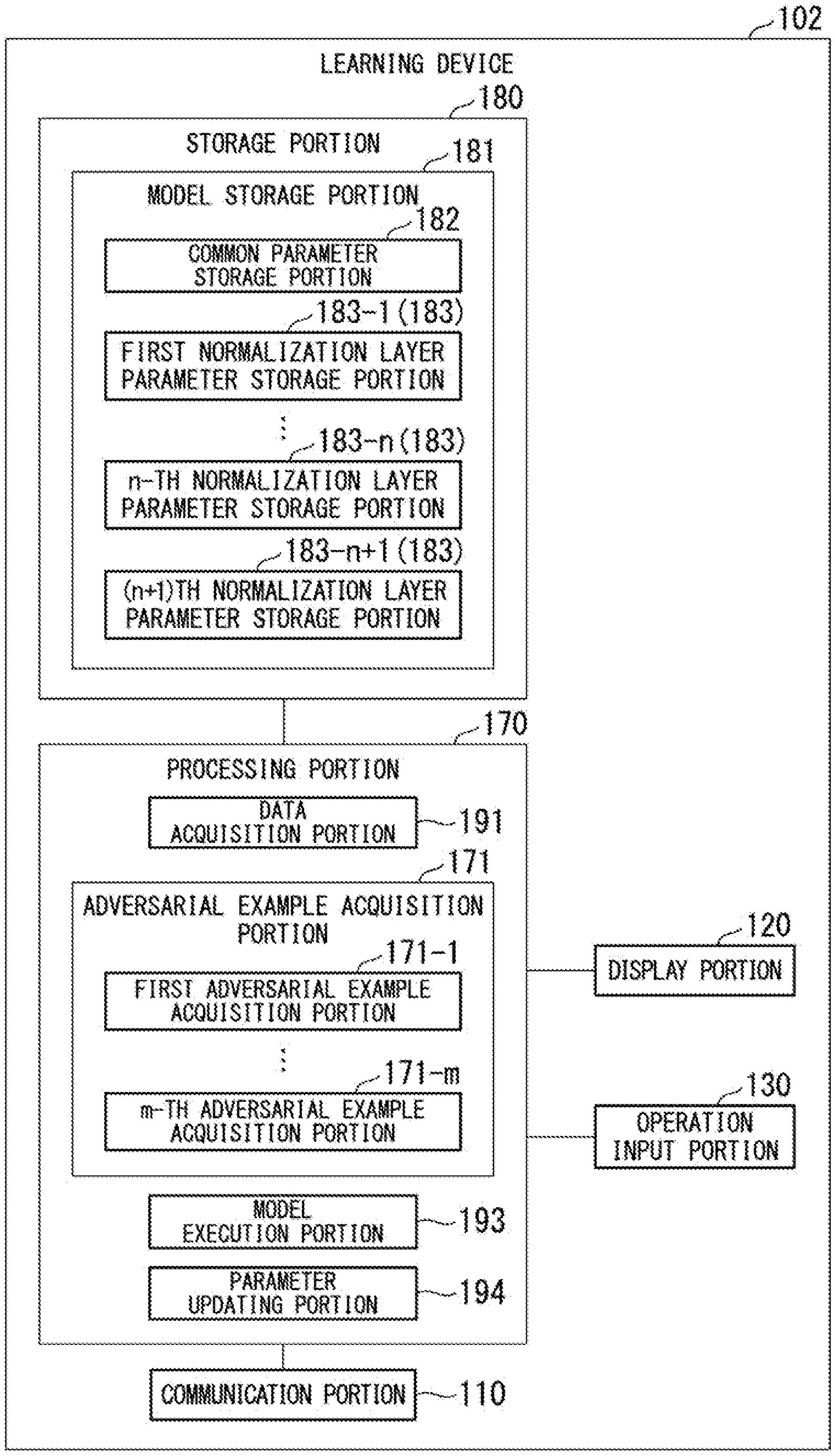
FIG. 5 is a diagram showing an example of the configuration of a learning device according to the second example embodiment.

FIG. 5 is a diagram showing an example of the configuration of the learning device according to the second example embodiment. In the configuration shown in FIG. 5, a learning device 102 is provided with the communication portion 110, the display portion 120, the operation input portion 130, the storage portion 180, and a processing portion 170. The storage portion 180 is provided with the model storage portion 181. The model storage portion 181 is provided with the common parameter storage portion 182 and a first normalization layer parameter storage portion 183-1 to (n+1)th normalization layer parameter storage portion 183-*n*+1. As stated above, n is a positive integer and represents the number of conditions for the generation of an adversarial example. The processing portion 170 is provided with a data acquisition portion 191, an adversarial example acquisition portion 171, a model execution portion 193, and a parameter updating portion 194. The adversarial example acquisition portion 171 is provided with the first adversarial example acquisition portion 171-1 to the m-th adversarial example acquisition portion **171-*m*. Here, m is an integer of 1≤m≤n. m represents the number of adversarial example generation algorithms used by the adversarial example acquisition portion 171**.

The same reference numerals (110, 120, 130, 180, 181, 182, 183-1, . . . , **183-*n*+1, 191, 193, 194) are attached to the parts of the learning device 102 shown in FIG. 5 that correspond to the parts of the learning device 101 shown in FIG. 1**, with detailed explanations being omitted here.

The learning device 102 differs from the learning device 101, in which the adversarial example acquisition portion 192 is provided with the first adversarial example acquisition portion 192-1 to the n-th adversarial example acquisition portion **192-*n*, in that the adversarial example acquisition portion 171 has from the first adversarial example acquisition portion 171-1 to the m-th adversarial example acquisition portion 171-*m*, and in at least one of these, the number of target classes is variable. In all other respects, the learning device 102 is similar to the learning device 101**.

When m=n in the configuration shown in FIG. 5, the configuration of the learning device 102 is the configuration of the learning device 101 shown in FIG. 1. The learning device 101 corresponds to an example of the learning device 102.

In the second example embodiment, the neural network 201 calculates features of the input data. When multiple target classes are set, the adversarial example acquisition portion 171 generates the adversarial example so that the neural network 201 receives the input of the adversarial example and calculates a feature that is similar to a feature associated with any of the multiple target classes.

An adversarial example for causing a neural network to compute features that are similar to features associated with any of several target classes is referred to as a Multi-Targeted Adversarial Example (MTAX). One of the algorithms used in the adversarial example acquisition portion 171 may be the known Multi-Targeted Adversarial Example generation algorithm, in which the number of target classes can be set to be variable.

As features associated with a target class, the features of data belonging to that target class (data for which that target class is the correct class) may be used. Alternatively, as a feature associated with the target class, a feature that synthesizes the features of multiple data belonging to that target class, such as the average value of the features of those multiple data (multiple data for which the target class is the correct class) may be used.

The adversarial example acquisition portion 171 generates adversarial data groups in each of multiple settings of the number of target classes using an algorithm with a variable number of target classes, and thereby can generate an adversarial data group for each of the n conditions with fewer algorithms than the n number of conditions for the generation of the adversarial examples.

As described above, the conditions for generating an adversarial example include the number of target classes of the adversarial example.

The adversarial example acquisition portion 171 generates adversarial data groups under each of the multiple settings of the number of target classes, and thereby can acquire adversarial data groups under each of the multiple conditions of target class generation.

By setting multiple target classes, the adversarial example acquisition portion 171 generates a multi-targeted adversarial example. A multi-targeted adversarial example can be viewed as an input in which the neural network is error-prone to any of the two target classes. It is expected that the accuracy of the neural network 201 will be improved by the learning device 102 learning the neural network 201 using the multi-targeted adversarial example.

Third Example Embodiment

The third example embodiment describes a case in which a learning device selects adversarial examples that induce estimation errors in the neural network 201 and uses them to learn the neural network 201.

Figure 6:
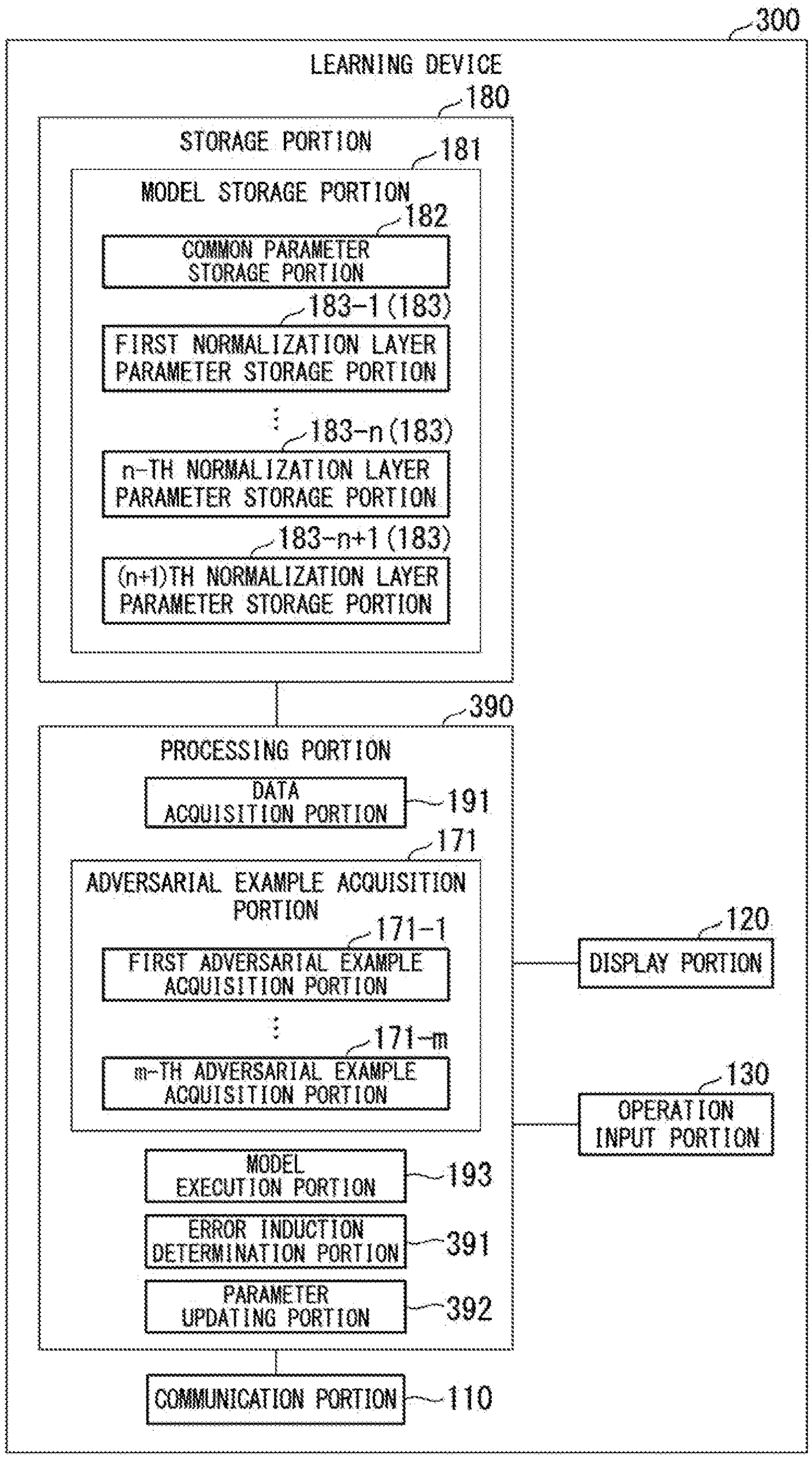
FIG. 6 is a diagram showing an example of the configuration of the learning device according to the third example embodiment.

FIG. 6 is a diagram showing an example of the configuration of the learning device according to the third example embodiment. In the configuration shown in FIG. 6, a learning device 300 is provided with the communication portion 110, the display portion 120, the operation input portion 130, the storage portion 180, and the processing portion 390. The storage portion 180 is provided with the model storage portion 181. The model storage portion 181 is provided with the common parameter storage portion 182 and a first normalization layer parameter storage portion 183-1 to (n+1)th normalization layer parameter storage portion **183-*n*+1. As stated above, n is a positive integer and represents the number of conditions for the generation of an adversarial example. The processing portion 390 is provided with a data acquisition portion 191, an adversarial example acquisition portion 171, a model execution portion 193, an error induction determination portion 391, and a parameter updating portion 392. The adversarial example acquisition portion 171 is provided with the first adversarial example acquisition portion 171-1 to the m-th adversarial example acquisition portion 171-*m*. As mentioned above, m is an integer of 1≤m≤n. m represents the number of adversarial example generation algorithms used by the adversarial example acquisition portion 171**.

The same reference numerals (110, 120, 130, 171, 171-1, . . . , **171-*m*, 180, 181, 182, 183-1, . . . , 183-*n*+1, 191, 193) are attached to the parts of the learning device 102 shown in FIG. 6 that correspond to the parts of the learning device 102 shown in FIG. 5**, with detailed explanations being omitted here.

The learning device 300 differs from the configuration of the learning device 102 shown in FIG. 5 in that the processing portion 390 is equipped with the error induction determination portion 391. The process performed by the parameter updating portion 392 in the learning device 300 is different from the process performed by the parameter updating portion 194 in the learning device 102. In other respects, the learning device 300 is similar to the learning device 102.

FIG. 6 shows an example of the third example embodiment based on the second example embodiment. In contrast, the third example embodiment may be implemented based on the first example embodiment.

The error induction determination portion 391 determines whether the input data to the neural network 201 induces errors in estimation using the neural network 201.

In the case of the neural network 201 being configured as categorical AI, the error induction determination portion 391 may determine that the input data is inducing an error in the estimate made using the neural network 201 when the class estimation result output by the neural network 201 is different from the correct class associated with the input data to the neural network 201.

Alternatively, in the case of the neural network 201 being configured as categorical AI, the error induction determination portion 391 may determine that the input data is inducing an error in the estimate made using the neural network 201 when the class estimation result output by the neural network 201 indicates the target class of the adversarial example, which is the input data.

When the neural network 201 is configured as feature-extraction AI, the error induction determination portion 391 may calculate the similarity between the feature output by the neural network 201 and the feature associated with the target class of the adversarial example, which is the input data to the neural network 201. If the calculated similarity indicates a similarity equal to or greater than a predetermined threshold, the error induction determination portion 391 may be configured to determine that the input data induces an error in estimation using the neural network 201.

The similarity index used by the error induction determination portion 391 is not limited to a specific one. The error induction determination portion 391 may calculate an index value, such as cosine similarity, as an indicator of the similarity of the two features, such that the larger the index value, the more similar the two features are. Alternatively, the error induction determination portion 391 may calculate an index value, such as the distance between two features in a feature space, that indicates that the smaller the index value, the more similar the two features are.

As mentioned above, a feature associated with a target class may be a feature of a single piece of data belonging to that target class. Alternatively, the feature associated with a target class may be a composite of features from multiple data, such as a feature that is the average of features of multiple data belonging to that target class.

In the parameter updating portion 392, the process when updating the parameter value of the partial network and the parameter value of the j-th normalization layer 230-*j* differs from that in the parameter updating portion 194. Otherwise, the parameter updating portion 392 is similar to the parameter updating portion 194.

The parameter updating portion 392 uses the adversarial example which the error induction determination portion 391 determined to induce an error in estimation using the neural network 201, among the adversarial examples included in the adversarial data group acquired by the j-th adversarial example acquisition portion 192-*j*, to update the parameter value of the partial network and the parameter value of the j-th normalization layer 230-*j*. As mentioned above, j represents an integer $1 \le j \le n$.

Figure 7:
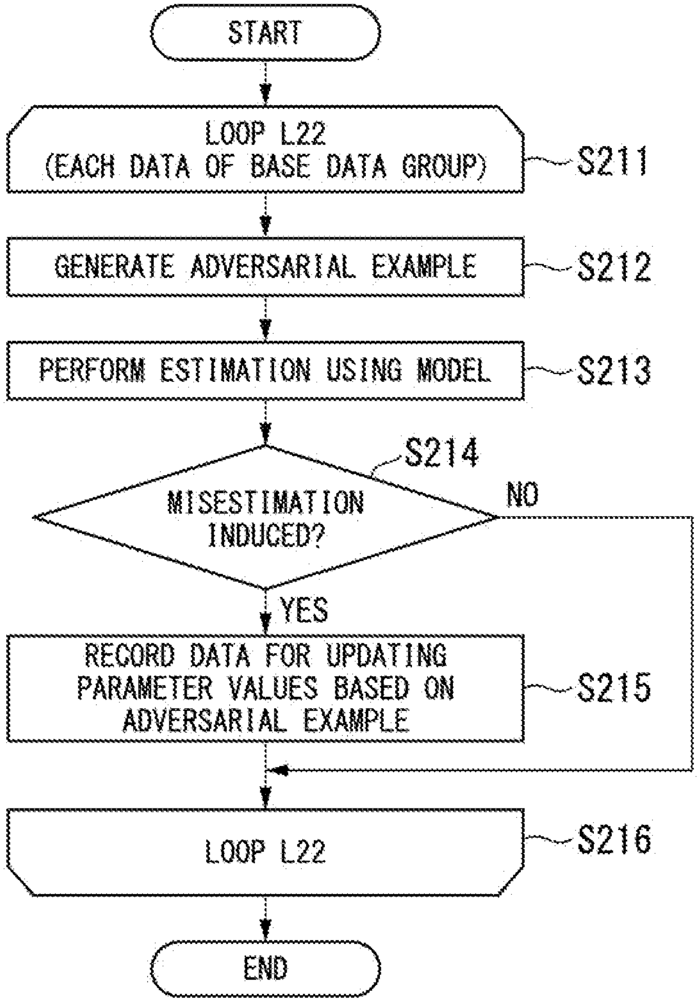
FIG. 7 is a diagram showing an example of the procedure in which the processing portion according to the third example embodiment collects data for updating parameter values based on adversarial examples.

FIG. 7 is a diagram that shows an example of the procedure in which processing portion 390 collects data for updating parameter values based on the adversarial example. The processing portion 390 trains the neural network 201 with the processing of FIG. 3, and performs the processing of FIG. 7 in Step S105 of FIG. 3.

Steps S211 through S213 in FIG. 7 are similar to steps S201 through S203 in FIG. 4. The loop initiated by the processing portion 390 in Step S211 is referred to as loop L22. The base data that is the subject of processing in the loop L41 is also referred to as the target base data.

After Step S213, the error induction determination portion 391 determines whether the adversarial example for the target base data induces an error in the estimation obtained using the neural network 201 (Step S214).

If the error induction determination portion 391 determines that the adversarial example for the target base data has induced an error in the estimation obtained using the neural network 201 (Step S214: YES), the parameter updating portion 392 stores data for updating parameter values based on the adversarial example in the storage portion 180 (Step S215).

For example, when using a learning method based on the error of data calculated by each part of the neural network 201, such as the error back-propagation method, the parameter updating portion 392 may calculate the error in each part of the neural network 201 that is subject to updating of the parameter value and store it in the storage portion 180. In this case, the parameter updating portion 392 calculates the average value of the errors stored by the storage portion 180 for each part of the neural network 201 in Step S106 of FIG. 3, and updates the parameter values by applying the learning method to the calculated average value.

Next, the processing portion 390 performs the termination of the loop L22 (Step S216).

Specifically, the processing portion 390 determines whether or not the processing of the loop L22 has been performed for all the base data included in the target base data group. In the second and subsequent iterations of the loop L11 (FIG. 3), the processing portion 390 determines whether or not the processing of the loop L22 has been performed for all base data included in the target base data group in that iteration.

If the processing portion 390 determines that there is base data for which the processing of the loop L22 has not yet been performed, processing returns to Step S211. In this case, the processing portion 390 continues to perform the loop L22 for the base data that has not been processed in the loop L22.

On the other hand, if it is determined that the processing of the loop L22 has been performed for all the base data included in the target base data group, the processing portion 390 ends the loop L22.

When the loop L22 is ended, the processing portion 390 ends the process in FIG. 7.

On the other hand, if the error induction determination portion 391 determines in Step S214 that the adversarial example for the target base data does not induce an error in the estimation using the neural network 201 (Step S214: NO), the process proceeds to Step S216. In this case, data is not recorded in Step S215. Therefore, the adversarial example for the target base data in this case is excluded from updating the parameter values of the common parts and the parameter value of the first normalization layer.

Figure 8:
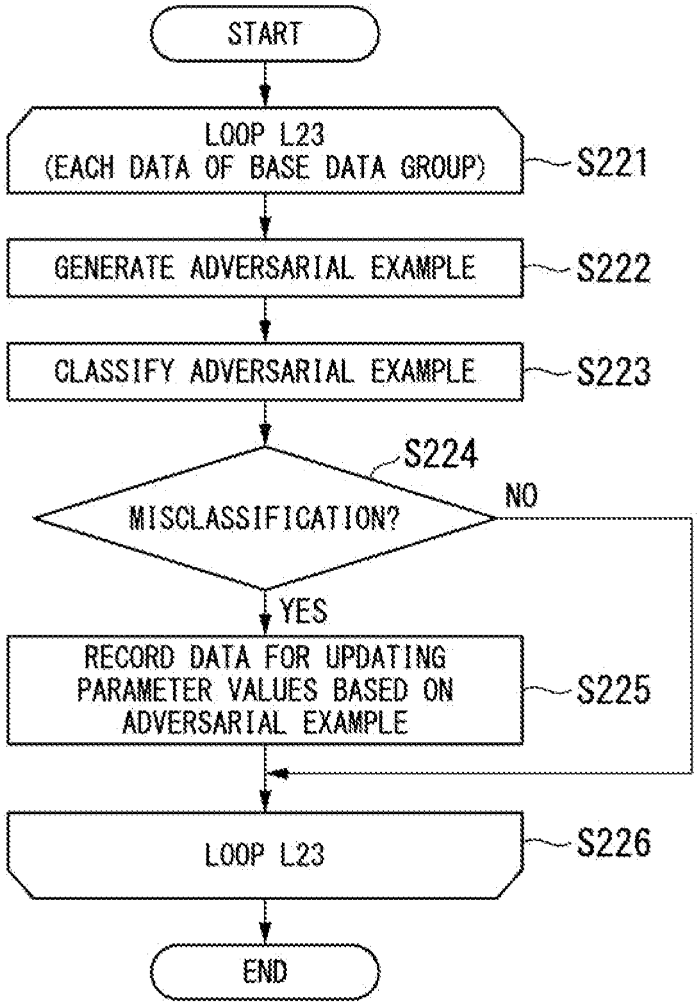
FIG. 8 is a diagram showing an example of the procedure in which the learning device collects data for updating parameter values based on adversarial examples when the neural network according to the third example embodiment is configured as categorical AI.

FIG. 8 shows an example of the procedure for the learning device 300 to collect data for updating parameter values based on adversarial examples when the neural network 201 is configured as categorical AI. The learning device 300 performs the process shown in FIG. 8 in Step S105 of FIG. 3.

The process shown in FIG. 8 corresponds to the example of the process shown in FIG. 7.

As described above, in the case of the neural network 201 being configured as categorical AI, the error induction determination portion 391 may determine that the input data is inducing an error in the estimate using the neural network 201 when the class estimation result output by the neural network 201 is different from the correct class associated with the input data to the neural network 201. FIG. 8 shows an example of the process in this case.

Steps S221 to S222 in FIG. 8 are similar to steps S211 to S212 in FIG. 7. The process of loop L23 in FIG. 8 corresponds to the example of the process of loop L22 in FIG. 7.

After Step S222, the model execution portion 193 performs class classification of the adversarial examples by applying the adversarial examples for the target base data to the neural network 201 (Step S223). The process in Step S223 corresponds to an example of the process in Step S213 of FIG. 7. In the example in FIG. 8, the adversarial example obtained in Step S222 corresponds to the adversarial example for the target base data.

Next, the error induction determination portion 391 determines whether the adversarial example for the target base data is misclassified by the class classification using the neural network 201 (Step S224). Misclassification here is when the neural network 201 classifies the input adversarial example into a class different from the class that is considered the correct class for that adversarial example. Alternatively, misclassification here may be defined as the neural network 201 classifying an input adversarial example into a class that is considered the target class for that adversarial example.

The process in Step S224 corresponds to an example of the process in Step S214 of FIG. 7.

If the error induction determination portion 391 determines that the adversarial example for the target base data is misclassified by class classification using the neural network 201 (Step S224: YES), the process proceeds to Step S225. On the other hand, if the error induction determination portion 391 determines that the adversarial example for the target base data is not misclassified by class classification using the neural network 201 (Step S224: NO), the process proceeds to Step S226.

Steps S225 to S226 are similar to steps S215 to S216 in FIG. 7.

If loop L23 is terminated in Step S226, the processing portion 190 ends the process in FIG. 8.

Figure 9:
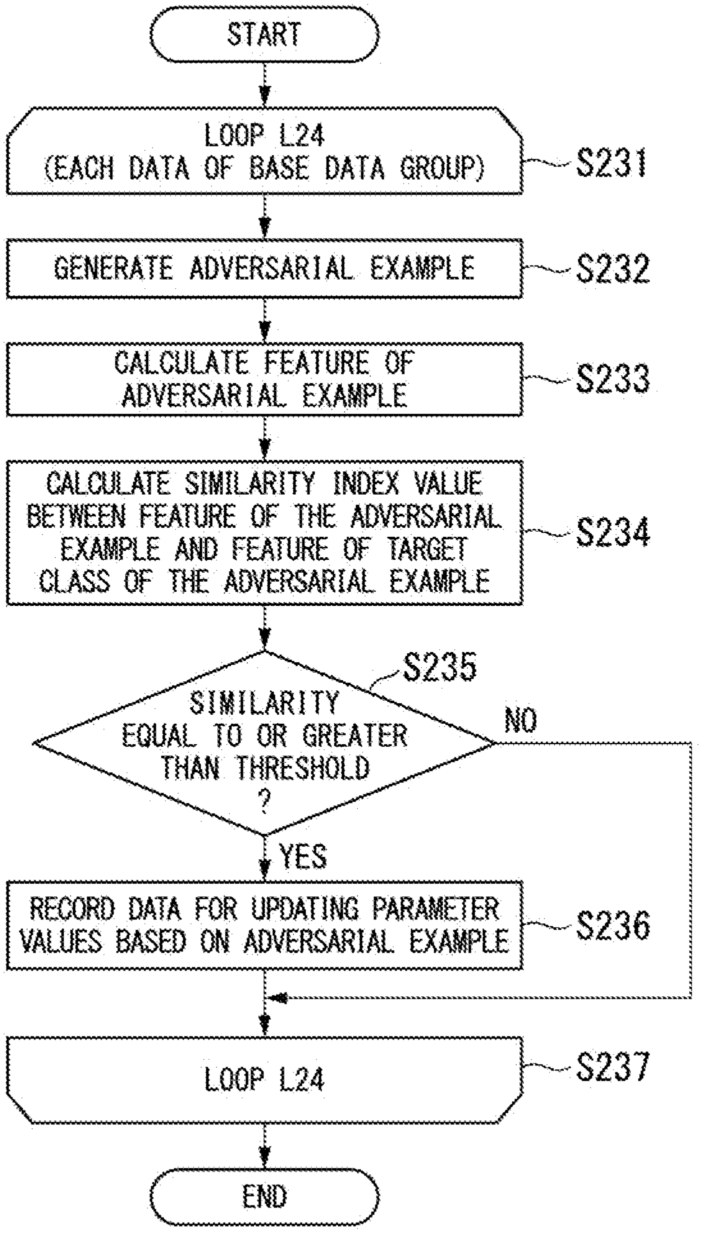
FIG. 9 is a diagram showing an example of the procedure in which the learning device collects data for updating parameter values based on adversarial examples when the neural network of the third example embodiment is configured as feature-extraction AI.

FIG. 9 shows an example of the procedure for the learning device 300 to collect data for updating parameter values based on adversarial examples when the neural network 201 is configured as feature-extraction AI. The learning device 300 performs the process shown in FIG. 9 in Step S105 of FIG. 3.

The process shown in FIG. 9 corresponds to the example of the process shown in FIG. 7.

As described above, in the case of the neural network 201 being configured as feature-extraction AI, the error induction determination portion 391 may determine that the input data is inducing an error in the estimate made using the neural network 201 when the class estimation result output by the neural network 201 indicates the target class of the adversarial example, which is the input data. FIG. 9 shows an example of the process in this case.

Steps S231 to S232 in FIG. 9 are similar to steps S211 to S212 in FIG. 7. The process of loop L24 in FIG. 9 corresponds to an example of the process of loop L22 in FIG. 7.

After Step S232, the model execution portion 193 calculates the feature of the adversarial example by applying the adversarial example for the target base data to the neural network 201 (Step S233). The process in Step S233 corresponds to an example of the process in Step S213 of FIG. 7. In the example in FIG. 9, the adversarial example obtained in Step S232 corresponds to the adversarial example for the target base data.

Next, the error induction determination portion 391 calculates the similarity between the feature of the adversarial example for the target base data and the feature associated with the target class of the adversarial example (Step S234).

Next, the error induction determination portion 391 determines whether the similarity calculated in Step S234 indicates that the similarity is equal to or greater than a predetermined threshold (Step S235). The process from Step S224 to Step S235 corresponds to an example of the process in Step S214 of FIG. 7.

If the error induction determination portion 391 determines that the similarity calculated in Step S234 indicates that the similarity is equal to or greater than a predetermined threshold (Step S235: YES), the process proceeds to Step S236. On the other hand, if the error induction determination portion 391 determines that the similarity calculated in Step S234 indicates that the similarity is not equal to or greater than a predetermined threshold (Step S235: NO), the process proceeds to Step S237.

Steps S236 to S237 are similar to steps S215 to S216 in FIG. 7.

If loop L24 is terminated in Step S237, the processing portion 190 ends the process in FIG. 9.

As described above, the error induction determination portion 391 determines whether, when data is input to the neural network 201, the data induces an error in estimation using the neural network 201. For each adversarial data group, the parameter updating portion 194 uses the adversarial examples included in that adversarial data group that have been determined to induce errors in estimation using the neural network to update the parameter values of the partial network and the parameter values of the normalization layer associated with the condition under which the adversarial examples in the adversarial data group were generated.

The learning device 300 selects an adversarial example that induces an error in estimation using the neural network 201 and uses it to train the neural network 201. According to the learning device 101, in this regard, the accuracy of the adversarial example can be taken into account when an adversarial example is used to train the neural network.

Here, an adversarial example that induces an error in estimation using neural network 201 can be viewed as input data with low accuracy in estimation using the neural network 201. It is expected that the neural network 201 can be trained efficiently by using this adversarial example.

On the other hand, an adversarial example that does not induce an error in estimation using the neural network 201 can be viewed as input data with relatively high accuracy in estimation using the neural network 201. If the adversarial examples used to train the neural network 201 include adversarial examples that do not induce errors in estimation using the neural network 201, the training of the neural network 201 will take longer, or the resulting accuracy of the neural network 201 may be relatively low.

In contrast, as described above, the learning device 300 selects an adversarial example that induces an error in estimation using the neural network 201 and uses it to train the neural network 201. According to the learning device 300, in this respect, it is expected that the time required to train the neural network 201 is relatively short, or that the accuracy of the neural network 201 obtained as a result of the training is relatively high.

The distribution of inputs to the neural network 201 is different for the base data and the adversarial example. The inclusion of a first normalization layer, which is associated with the input of the adversarial example, and a second normalization layer, which is associated with the input of the base data, in the neural network 201 is expected to allow the learning device 101 to train the neural network 201 relatively efficiently using these normalization layers.

The neural network 201 is also configured as categorical AI, which receives the input of data and performs class classification of that data. When the neural network 201 classified the input adversarial example into a class different from the class that is considered the correct class for that adversarial example, the error induction determination portion 391 determines that that adversarial example induces an error in estimation using the neural network 201.

Thus, according to the learning device 300, in the learning of a neural network configured as categorical AI, the above-mentioned effects of a relatively short time required for learning a neural network or a relatively high accuracy of a neural network obtained as a learning result are expected.

The neural network 201 is also configured as categorical AI, which receives the input of data and performs class classification of that data. When the neural network 201 classified the input adversarial example into a class that is considered the target class for that adversarial example, the error induction determination portion 391 determines that that adversarial example induces an error in estimation using that neural network.

Thus, according to the learning device 300, in the learning of a neural network configured as categorical AI, the above-mentioned effects of a relatively short time required for learning a neural network or a relatively high accuracy of a neural network obtained as a learning result are expected.

According to the learning device 300, if the target class of the adversarial example acquired by the adversarial example acquisition portion 192 is specified as a particular class, it is expected to be able to efficiently learn about class classification between the correct class and the target class.

The neural network 201 is configured as feature-extraction AI, which receives the input of data and extracts features of the data. The error induction determination portion 391 calculates the similarity between the features extracted by the neural network 201 for the input adversarial example and the features associated with the target class of the adversarial example, and if the calculated similarity indicates a similarity equal to or greater than a predetermined threshold value, it determines that the adversarial example induces an error in the estimation using the neural network 201.

Thus, according to the learning device 300, in the learning of a neural network configured as feature-extraction AI, the above-mentioned effects of a relatively short time required for learning a neural network or a relatively high accuracy of a neural network obtained as a learning result are expected.

Fourth Example Embodiment

The learning device may take into account the similarity of features to set the target class in an adversarial example. The fourth example embodiment explains this point.

Figure 10:
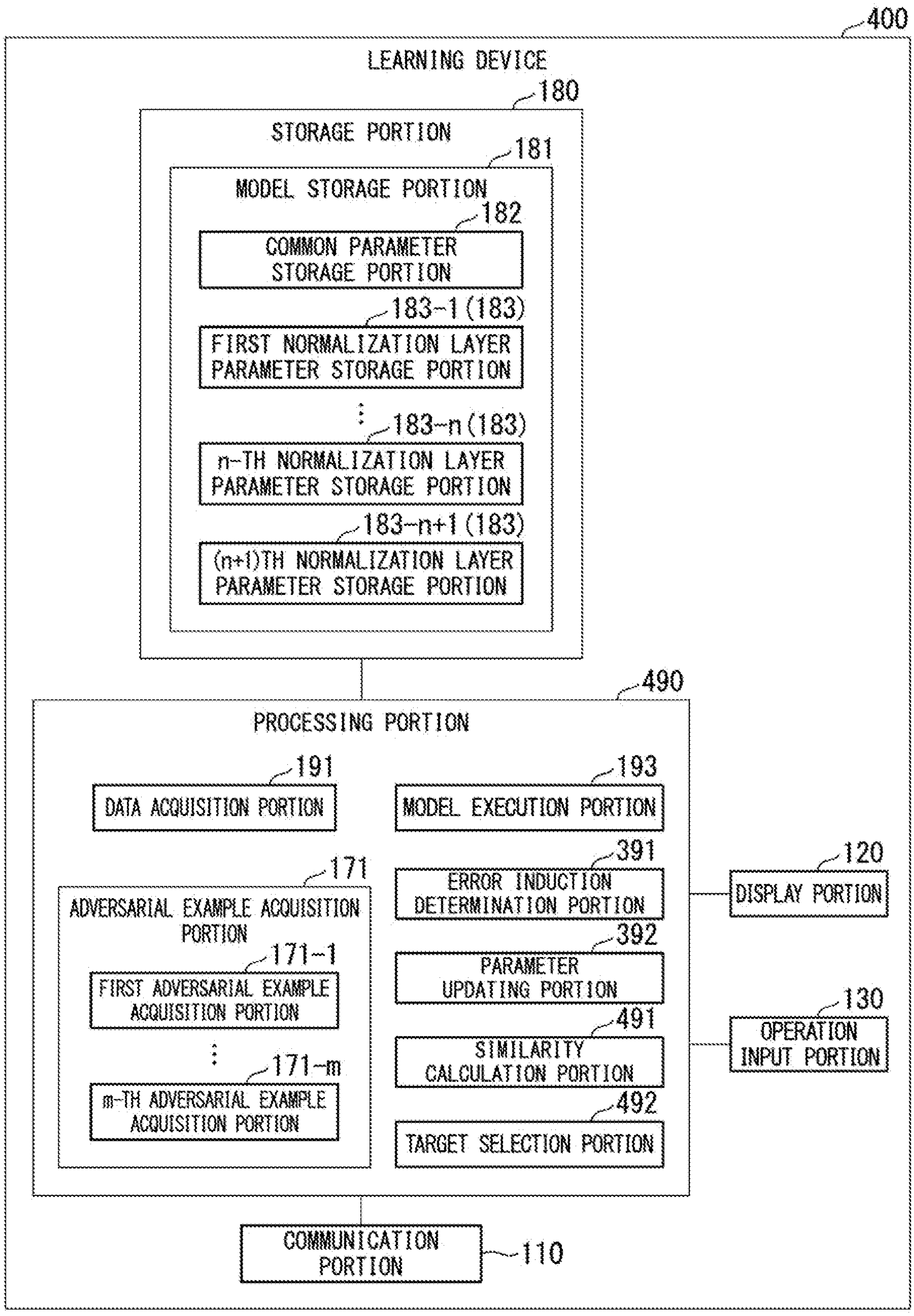
FIG. 10 is a diagram showing an example of the configuration of the learning device according to the fourth example embodiment.

FIG. 10 is a diagram showing an example of the configuration of the learning device according to the fourth example embodiment. In the configuration shown in FIG. 10, a learning device 400 is provided with the communication portion 110, the display portion 120, the operation input portion 130, the storage portion 180, and the processing portion 490. The storage portion 180 is provided with the model storage portion 181. The model storage portion 181 is provided with the common parameter storage portion 182 and a first normalization layer parameter storage portion 183-1 to (n+1)th normalization layer parameter storage portion **183-*n*+1. As stated above, n is a positive integer and represents the number of conditions for the generation of an adversarial example. The processing portion 490 is provided with the data acquisition portion 191, the adversarial example acquisition portion 171, the model execution portion 193, the error induction determination portion 391, the parameter updating portion 392, a similarity calculation portion 491, and a target selection portion 492. The adversarial example acquisition portion 171 is provided with the first adversarial example acquisition portion 171-1 to the m-th adversarial example acquisition portion 171-*m*. As mentioned above, m is an integer of 1≤m≤n, representing the number of adversarial example generation algorithms used by the adversarial example acquisition portion 171**.

The same reference numerals (110, 120, 130, 171, 171-1, . . . , **171-*m*, 180, 181, 182, 183-1, . . . , 183-*n*+1, 191, 193) are attached to the parts of the learning device 400 shown in FIG. 10 that correspond to the parts of the learning device 300 shown in FIG. 6**, with detailed explanations being omitted here.

In the learning device 400, the processing portion 490 is provided with the similarity calculation portion 491 and the target selection portion 492, in addition to the parts provided by the processing portion 390 of the learning device 300. In other respects, the learning device 400 is similar to the learning device 300.

FIG. 10 shows an example of the fourth example embodiment based on the third example embodiment. In contrast, the fourth example embodiment may be implemented based on the first example embodiment or the second example embodiment.

The similarity calculation portion 491 calculates an index value indicating the similarity of two features. In particular, the similarity calculation portion 491 calculates an index value indicating the degree of similarity between a feature of the base data and a feature associated with the class that is considered a candidate target class when the adversarial example acquisition portion 171 generates an adversarial example for that base data.

The index used by the similarity calculation portion 491 is not limited to a specific one. The similarity calculation portion 491 may calculate an index value, such as cosine similarity, as an indicator of the similarity of the two features, such that the larger the index value, the more similar the two features are. Alternatively, the similarity calculation portion 491 may calculate an index value, such as the distance between two features in a feature space, that indicates that the smaller the index value, the more similar the two features are.

The index used by the similarity calculation portion 491 may be the same as or different from the index indicating the similarity of the features calculated by the error induction determination portion 391 when the neural network 201 is configured as feature-extraction AI. The similarity calculation portion 491 may be configured as part of the error induction determination portion 391.

The target selection portion 492 sets any of the classes other than the correct class of the base data as the target class based on the similarity between the feature of the base data and the features associated with the class other than the correct class of that base data.

For example, the similarity calculation portion 491 may calculate, for each class other than the correct class of the base data, an index indicating the similarity between the feature of the base data and the feature associated with that class. The target selection portion 492 may then set the target class to a class other than the correct class of the base data for which the index calculated by the target selection portion 492 indicates the highest feature similarity.

The adversarial example acquisition portion 171 generates an adversarial example for the base data using the class set by the target selection portion 492 as the target class.

Figure 11:
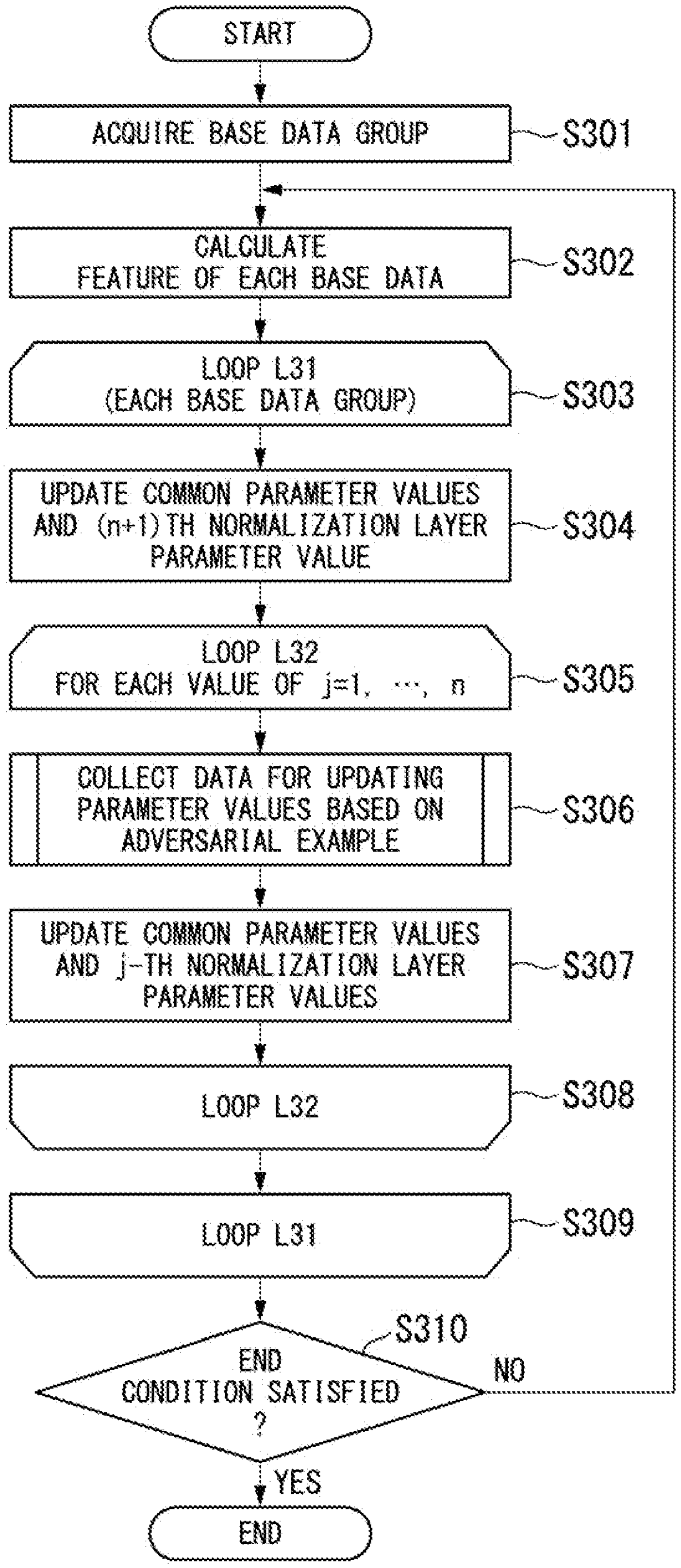
FIG. 11 is a diagram showing an example of the procedure in which the processing portion according to the fourth example embodiment learns a neural network.

FIG. 11 shows an example of the procedure in which the processing portion 390 trains the neural network 201.

Step S301 in FIG. 11 is similar to Step S101 in FIG. 3.

After Step S301, the model execution portion 193 calculates the feature of each base data included in each base data group acquired in Step S301 (Step S302).

If the neural network 201 is configured as feature-extraction AI, the model execution portion 193 may input each base data to the neural network 201 and acquire the feature output by the neural network 201.

If the neural network 201 is configured as categorical AI, the model execution portion 193 may input each base data to the neural network 201 to acquire the feature that the neural network 201 calculates for classifying the base data.

Steps S303 through S310 are similar to steps S102 through S109 in FIG. 3, except for the processing in Step S306. The processing of loop L31 in FIG. 11 is similar to that of loop the L11 in FIG. 3. The base data group that is the target of processing in loop L31 is also referred to as the target base data group. The processing of loop L32 in FIG. 11 is similar to that of loop the L12 in FIG. 3.

In Step S310, if the processing portion 490 determines that the conditions for completion of the learning have not been met (Step S3109: NO), the process returns to Step S302. In this case, the processing portion 490 updates the feature of each base data in Step S302 and repeats the process of the loop L31 to repeatedly update the parameter values of the neural network 201.

On the other hand, if the condition for completion of the learning is determined to be satisfied (Step S310: YES), the processing portion 490 completes the processing in FIG. 11.

Figure 12:
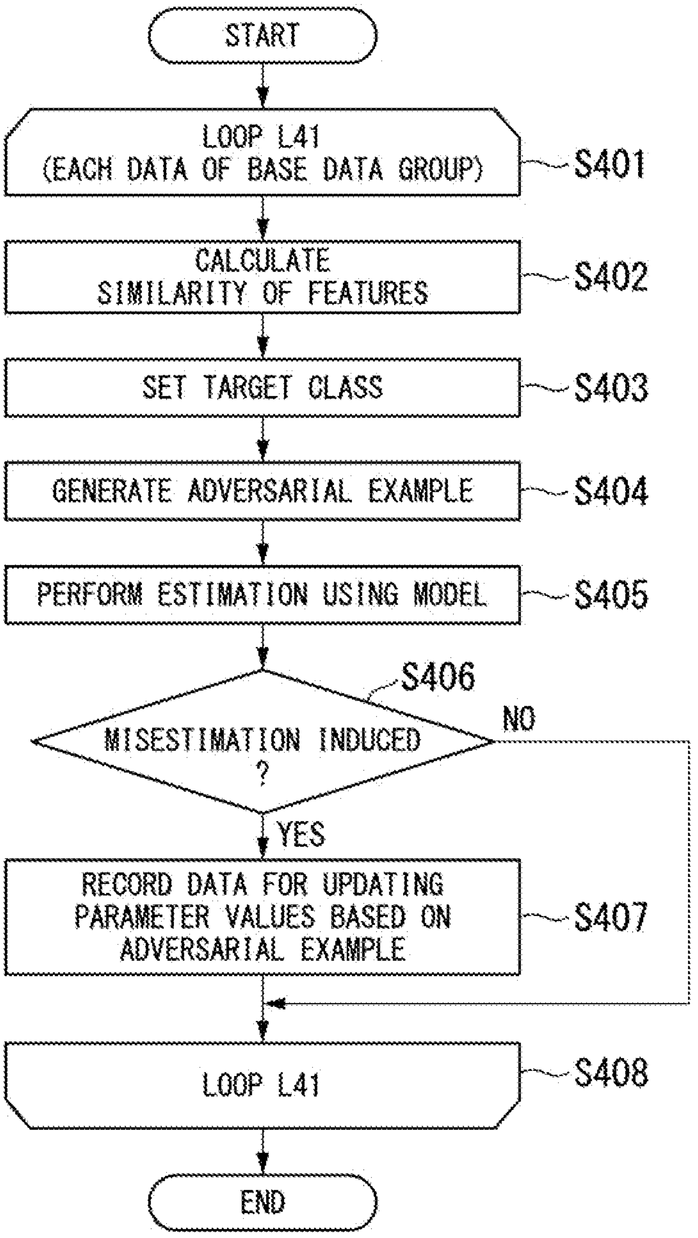
FIG. 12 is a diagram showing an example of the procedure in which the processing portion according to the fourth example embodiment collects data for updating parameter values based on adversarial examples.

FIG. 12 is a diagram that shows an example of the procedure in which processing portion 490 collects data for updating parameter values based on the adversarial example. The processing portion 490 performs the processing of FIG. 12 in Step S306 of FIG. 11.

Step S401 in FIG. 12 is similar to Step S211 in FIG. 7. The loop that the processing portion 490 initiates in Step S401 is referred to as loop L41. The base data that is the subject of processing in the loop L41 is also referred to as the target base data.

In the process of loop L41, the similarity calculation portion 491 calculates, for each class other than the correct class of the target base data, an index indicating the similarity between the feature of the target base data and the feature associated with that class (Step S402).

Next, the target selection portion 492 sets any of the classes other than the correct class of the target base data as the target class based on the index value calculated by the similarity calculation portion 491 (Step S403).

Steps S404 through S408 are similar to steps S212 through S216 in FIG. 7.

In Step S404, the adversarial example acquisition portion 192 generates an adversarial example whose target class is the target class set by the target selection portion 492 in Step S403.

If loop L41 is terminated in Step S408, the processing portion 490 ends the process in FIG. 12.

As described above, the adversarial example acquisition portion 171 generates an adversarial example that, based on the similarity between the feature of base data included in the base data group and the feature associated with a class other than the correct class of that base data, has any of the classes other than the correct class of that base data as its target class.

This allows the adversarial example acquisition portion 171 to generate adversarial examples with relatively high similarity between the features of the base data and the features associated with the target class, and the acquired adversarial examples are expected to be relatively more likely to induce errors in estimation using the neural network 201.

An adversarial example with a relatively high possibility of inducing an error in estimation using the neural network 201 can be viewed as input data by which the accuracy of estimation using the neural network 201 is relatively low. By learning the neural network 201 using this adversarial example, it is expected that the learning can be performed more efficiently.

Fifth Example Embodiment

The fifth example embodiment describes an example of an estimation device during operation using a learned neural network and the configuration of the neural network.

Figure 13:
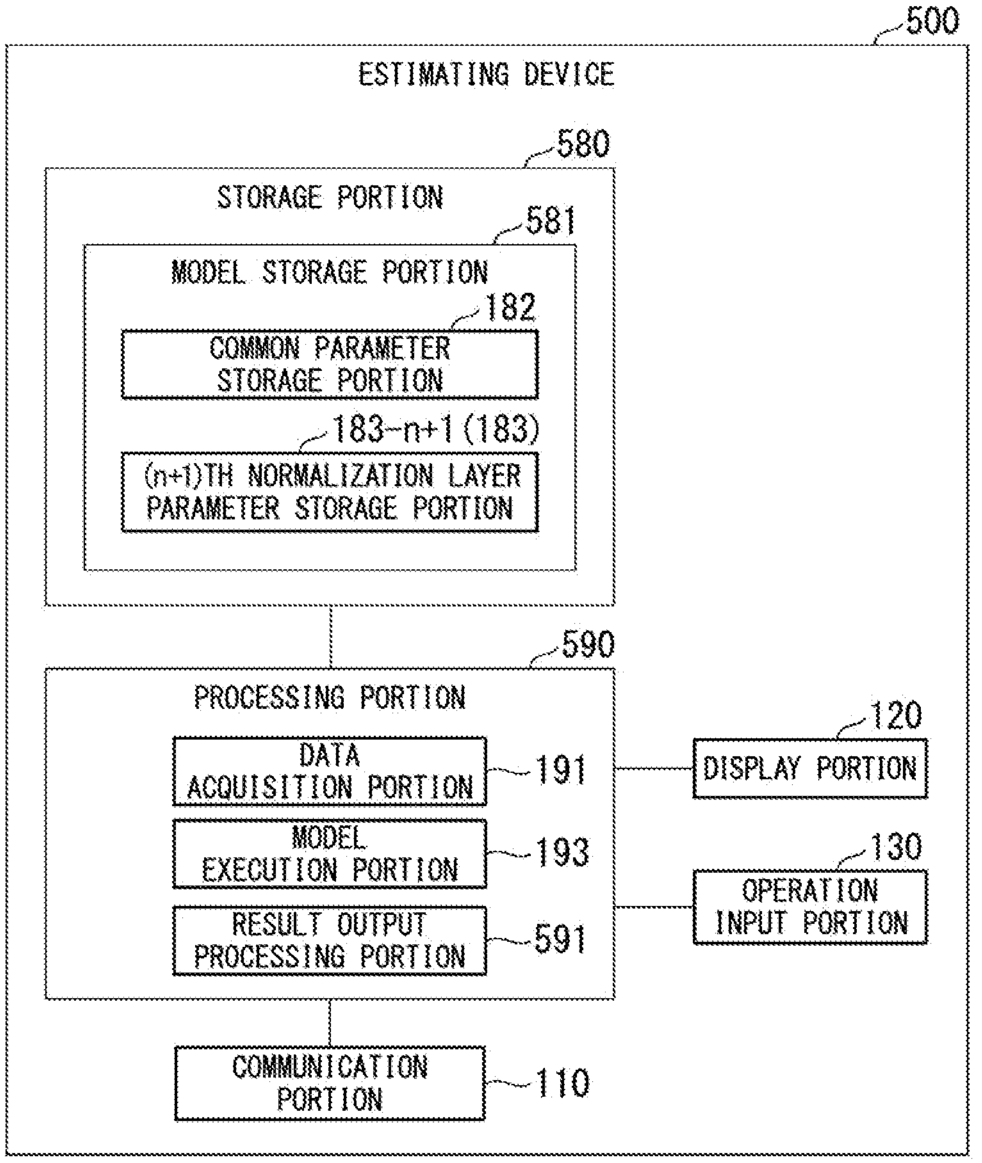
FIG. 13 is a diagram showing an example of the configuration of the estimating device according to the fifth example embodiment.

FIG. 13 is a diagram showing an example of the configuration of the estimating device according to the fifth example embodiment. In the configuration shown in FIG. 13, an estimation device 500 is provided with the communication portion 110, the display portion 120, the operation input portion 130, the storage portion 580, and the processing portion 590. The storage portion 580 is equipped with a model storage portion 581. The model storage portion 581 is provided with the common parameter storage portion 182 and the (n+1)th normalization layer parameter storage portion 183-*n*+1. The processing portion 590 is provided with the data acquisition portion 191, the model execution portion 193, and a result output processing portion 591.

The same reference numerals (110, 120, 130, 182, 183-*n*+1, 191, 193) are attached to the parts of the estimation device 500 shown in FIG. 13 that have similar functions corresponding to the parts of the learning device 101 shown in FIG. 1, and detailed descriptions are omitted here.

In the estimation device 500, the storage portion 580 is not provided with the first normalization layer parameter storage portion 183-1 to the n-th normalization layer parameter storage portion 183-*n*, among the portions provided by the storage portion 180 of the learning device 101. In the estimation device 500, the processing portion 590 is not provided with the adversarial example acquisition portion 192 and the parts thereof as well as the parameter updating portion 194, among the parts provided by the processing portion 190 of the learning device 101, but is provided with the result output processing portion 591. Otherwise, the estimation device 500 is similar to the learning device 101.

Figure 14:
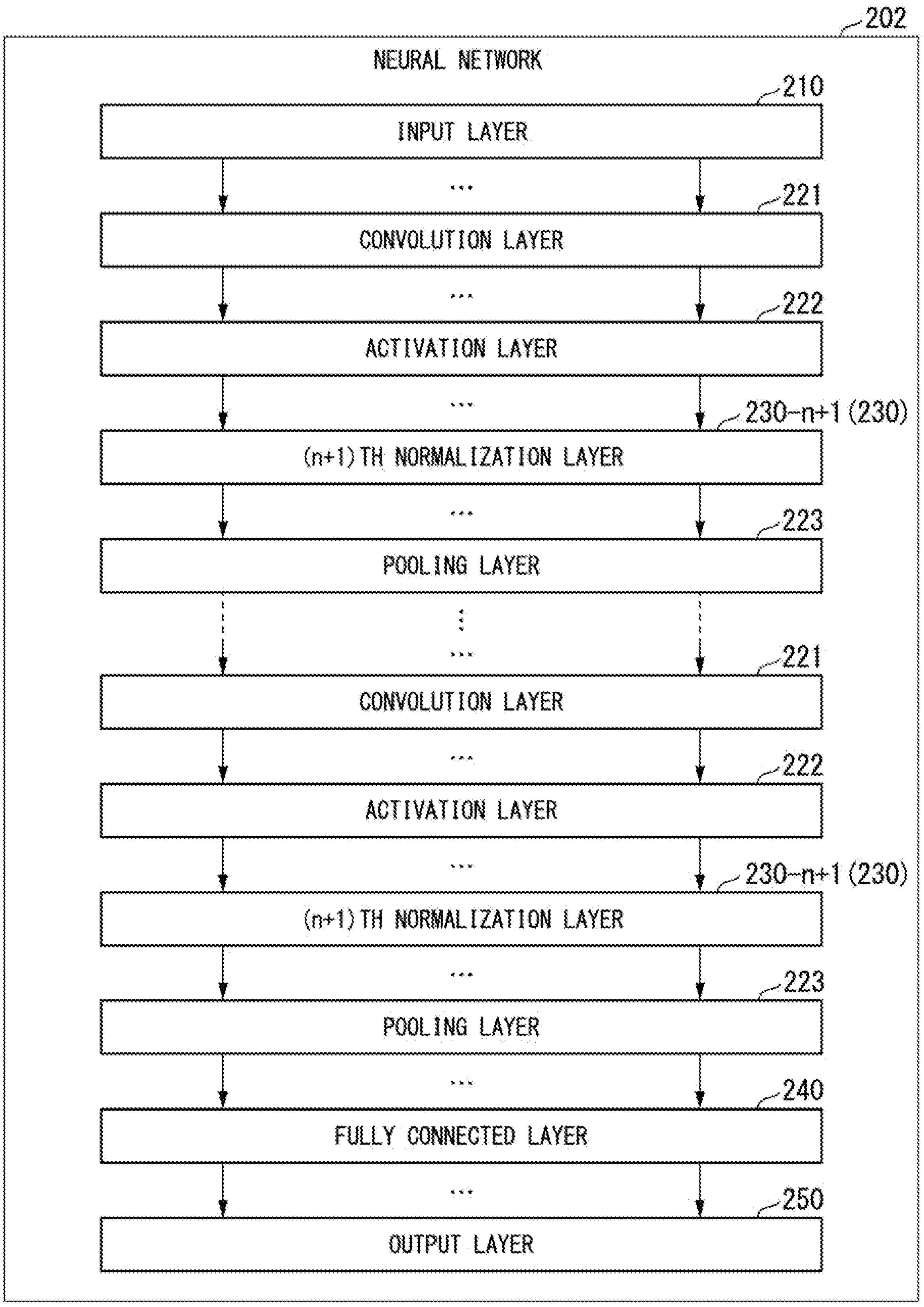
FIG. 14 is a diagram showing an example of a neural network stored by the model storage portion according to the fifth example embodiment.

FIG. 14 is a diagram showing an example of a neural network stored by the model storage portion 581. The neural network 202 shown in FIG. 14 is not provided with the first normalization layer 230-1 to the n-th normalization layer 230-*n* among the parts that the neural network 201 shown in FIG. 2 is provided with. Otherwise, the neural network 202 is similar to the neural network 201.

The same reference numerals (210, 221, 222, 223, 230-*n*+1, 240, 250) are attached to the parts of the neural network 202 shown in FIG. 14 that have similar functions corresponding to the parts of the neural network 201 shown in FIG. 2, and detailed descriptions are omitted here.

Since no learning is performed in the neural network 202, the first normalization layer 230-1 to the n-th normalization layer 230-*n*, which were provided in the neural network 201 for learning in response to differences in the distribution of input data, are not provided.

The neural network 202 receives the input of data and outputs the results of estimation on the input data.

The neural network 202 may be configured as categorical AI or feature-extraction AI. When configured as categorical AI, the neural network 202 receives the input of data and outputs an estimate of the class of that data. When configured as feature-extraction AI, the neural network 202 receives the input of data and outputs the features of the data.

Since the neural network 202 is not equipped with the first normalization layer 230-1 to the n-th normalization layer 230-*n*, the model storage portion 581 of the estimation device 500 is also not equipped with the first normalization layer parameter storage portion 183-1 to the n-th normalization layer parameter storage portion 183-*n*.

Since the estimation device 500 does not perform learning of neural networks, it is not equipped with the adversarial example acquisition portion 192, which acquires adversarial examples used as data for learning, and the parameter updating portion 194, which updates parameter values, among the parts provided by the learning device 101.

In the estimation device 500, the data acquisition portion 191 acquires input data for the neural network 202.

The model execution portion 193 inputs the data acquired by the data acquisition portion 191 to the neural network 202 to obtain an estimation result using the neural network 202.

The result output processing portion 591 outputs the acquired estimation result. The method by which the result output processing portion 591 outputs the estimation result is not limited to a specific method. For example, the result output processing portion 591 may output the estimation result by displaying the estimation result on the display portion 120. Alternatively, the result output processing portion 591 may transmit the estimation result to other devices via the communication portion 110.

Alternatively, the neural network 201 shown in FIG. 2 may also be used during operation.

The estimation device 500 can be used for a variety of estimations. For example, the estimation device 500 may perform biometric authentication such as facial, fingerprint, or voiceprint recognition.

In this case, the estimation device 500 may attempt to classify the input data into any of the registered classes of persons, thereby authenticating the person indicated by the input data as any of the registered persons, or may fail to do so.

Alternatively, the estimation device 500 may extract the feature of the input data and compare the similarity with the feature of the data of the designated person to determine whether the person indicated by the input data and the designated person are the same person.

Alternatively, the estimation device 500 may be used in devices for applications other than biometrics, such as devices that make various predictions.

Sixth Example Embodiment

Figure 15:
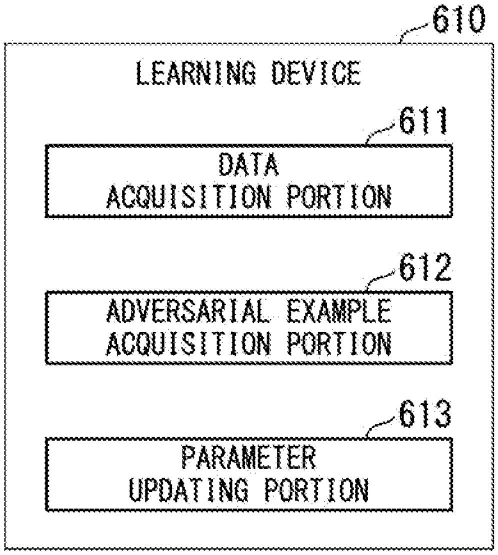
FIG. 15 is a diagram showing an example of the configuration of the learning device according to the sixth example embodiment.

FIG. 15 is a diagram showing an example of the configuration of the learning device according to the sixth example embodiment. In the configuration shown in FIG. 15, a learning device 610 is provided with a data acquisition portion 611, an adversarial example acquisition portion 612, and a parameter updating portion 613.

In such a configuration, the data acquisition portion 611 acquires a base data group, which is a group including multiple data.

For each condition of adversarial example generation, the adversarial example acquisition portion 612 uses the data included in the base data group to acquire an adversarial data group, which is a group including two or more adversarial examples generated under that condition.

The parameter updating portion 613 uses the base data group to update the parameter values of the sub-network and the parameter values of the normalization layers associated with the entire base data group for the neural network, and uses each adversarial data group to update the parameter values of the sub-network and the parameter values of the normalization layers associated with the conditions under which the adversarial examples included in that adversarial data group are generated. The neural network here includes a sub-network, a normalization layer associated with the entire base data group, and a normalization layer associated with each condition of generation of an adversarial example. Each of these normalization layers normalizes the data input to the normalization layer itself using the average value and variance value set for each normalization layer.

The data acquisition portion 611 corresponds to an example of a data acquisition means. The adversarial example acquisition portion 612 corresponds to an example of an adversarial example acquisition means. The parameter updating portion 613 corresponds to an example of a parameter updating means.

In this way, the neural network has a normalization layer for each condition of generation of adversarial examples, and the learning device 610 uses an adversarial data group including adversarial examples generated under each condition of generation of adversarial examples to learn the parameter values of the partial network and the parameter values of the normalization layer associated with the condition. According to the learning device 610, in this regard, when adversarial examples are used to train neural networks, the diversity of the adversarial examples can be reflected in the training.

Here, an adversarial example, which is created by a small perturbation, can be viewed as an input intended to induce error in a neural network, and adversarial examples can be used to train a neural network in order to improve the accuracy of the neural network. In other words, an adversarial example could be used as training data to compensate for the weakness of the neural network by training the neural network to be able to make accurate predictions on error-prone data.

In order to effectively train the neural network, a normalization layer, such as batch normalization, could be added to adjust the distribution of the data. When both the base data group and the adversarial data group are used to train a neural network, the distribution of data differs between the base data group and the adversarial data group for training the neural network, so a normalization layer may be provided for each to improve the efficiency of the training.

Moreover, the training device 610 trains the neural network using the base data group and the adversarial data group for each condition of the generation of adversarial examples. The distribution of adversarial examples included in the adversarial data group differs for each condition of adversarial example generation.

In the learning device 610, in terms of learning the parameter values of the common parts and the parameter values of the normalization layer for each condition of generation of adversarial examples, it is expected that the neural network can be trained in response to differences in the distribution of data according to the diversity of the adversarial examples, and the learning can be performed efficiently.

The data acquisition portion 611 can be realized, for example, using functions such as the data acquisition portion 191 in FIG. 1. The adversarial example acquisition portion 612 can be realized, for example, using functions such as the adversarial example acquisition portion 192 in FIG. 1. The parameter updating portion 613 can be realized using, for example, the functions of the parameter updating portion 194, and the like in FIG. 1.

Seventh Example Embodiment

Figure 16:
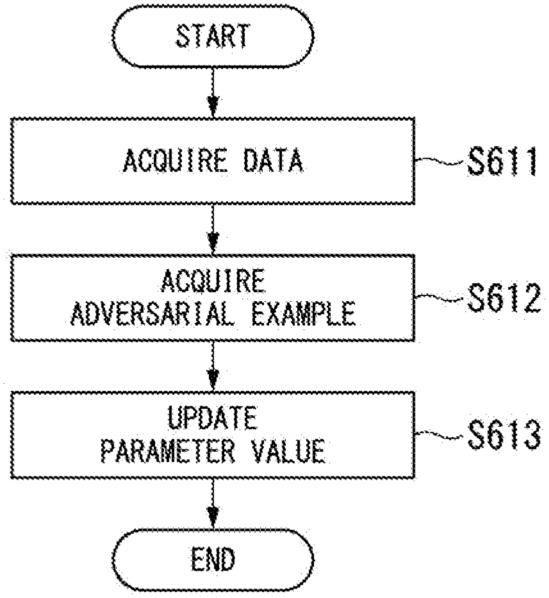
FIG. 16 is a diagram showing an example of the processing procedure in the learning method according to the seventh example embodiment.

FIG. 16 is a diagram showing an example of the processing procedure in the learning method according to the seventh example embodiment. The learning method shown in FIG. 16 includes acquiring data (Step S611), acquiring adversarial examples (Step S612), and updating parameter values (Step S613).

In acquiring data (Step S611), a computer acquires a base data group, which is a group including multiple pieces of data.

In acquiring adversarial examples (Step S612), the computer acquires an adversarial data group, which is a group including two or more adversarial examples generated under each condition of generating adversarial examples, using the data contained in the base data group.

In updating the parameter values (Step S613), the computer, for a neural network that includes a partial network, a normalization layer associated with the entire base data group, and a normalization layer associated with each condition of the generation of the adversarial example, each of these normalization layers normalizing the data input to the normalization layer itself using the average value and variance value set for each normalization layer, uses the base data group to update a parameter value of the partial network and a parameter value of the normalization layer associated with the entire base data group, and uses each adversarial data group to update the parameter value of the partial network and the parameter value of the normalization layer associated with the condition under which the adversarial example included in that adversarial data group was generated.

In this way, a normalization layer is provided for each condition of generation of adversarial examples in the neural network, and the learning method shown in FIG. 16 uses an adversarial data group containing adversarial examples generated under each condition of generation of adversarial examples to learn the parameter values of the partial network and the parameter values of the normalization layer associated with the condition. According to the learning method shown in FIG. 16, in this regard, when adversarial examples are used to learn neural networks, the diversity of the adversarial examples can be reflected in the training.

Here, an adversarial example, which is created by a small perturbation, can be viewed as an input intended to induce error in a neural network, and adversarial examples can be used to train a neural network in order to improve the accuracy of the neural network. In other words, an adversarial example could be used as training data to compensate for the weakness of the neural network by training the neural network to be able to make accurate predictions on error-prone data.

In order to effectively train the neural network, a normalization layer, such as batch normalization, could be added to adjust the distribution of the data. When both the base data group and the adversarial data group are used to train a neural network, the distribution of data differs between the base data group and the adversarial data group for training the neural network, so a normalization layer may be provided for each to improve the efficiency of the training.

Moreover, the training method shown in FIG. 16 trains the neural network using the base data group and the adversarial data group for each condition of the generation of adversarial examples. The distribution of adversarial examples included in the adversarial data group differs for each condition of adversarial example generation.

In the learning method shown in FIG. 16, in terms of learning the parameter values of the common parts and the parameter values of the normalization layer for each condition of generation of adversarial examples, it is expected that the neural network can be trained in response to differences in the distribution of data according to the diversity of the adversarial examples, and the learning can be performed efficiently.

Figure 17:
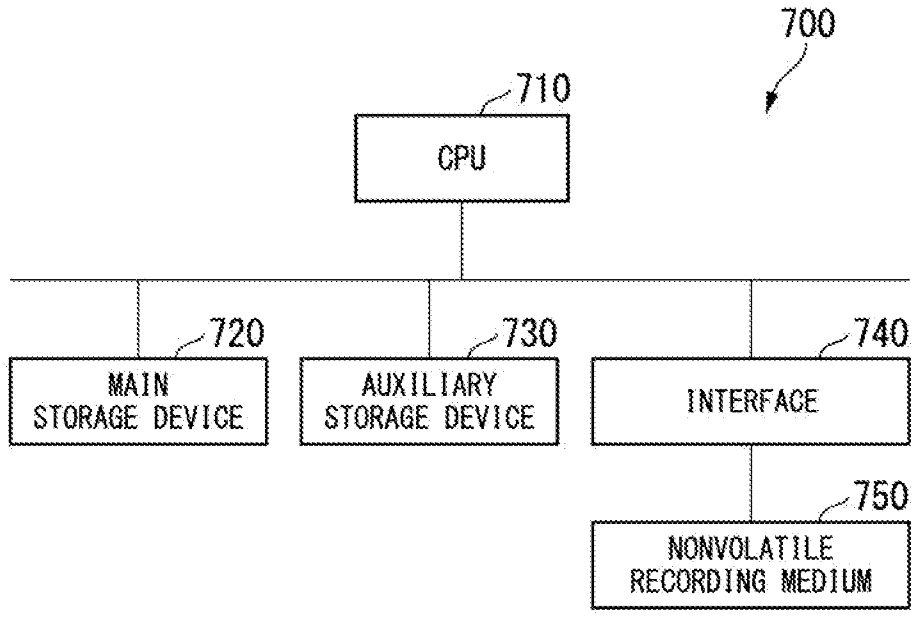
FIG. 17 is a schematic block diagram showing a computer according to at least one example embodiment.

FIG. 17 is a schematic block diagram showing a computer according to at least one example embodiment.

In the configuration shown in FIG. 17, a computer 700 is provided with a CPU 710, a main storage device 720, an auxiliary storage device 730, an interface 740, and a nonvolatile recording medium 750.

Any one or more of the learning device 101, learning device 102, learning device 300, learning device 400, estimation device 500, and learning device 610, or any part thereof, may be implemented in the computer 700. In that case, the operations of each of the above-mentioned processing portions are stored in the auxiliary storage device 730 in the form of a program. The CPU 710 reads the program from the auxiliary storage device 730, deploys it in the main storage device 720, and executes the above processing according to the program. The CPU 710 also reserves a storage area in the main storage device 720 corresponding to each of the above-mentioned storage portions according to the program. Communication between each device and other devices is performed by the interface 740, which has a communication function and communicates according to the control of the CPU 710. The interface 740 also has a port for the nonvolatile recording medium 750, and reads information from and writes information to the nonvolatile recording medium 750.

When the learning device 101 is implemented in the computer 700, the operations of the processing portion 190 and the various parts thereof are stored in the auxiliary storage device 730 in the form of a program. The CPU 710 reads the program from the auxiliary storage device 730, deploys it in the main storage device 720, and executes the above processing according to the program.

The CPU 710 also reserves storage space in the main storage device 720 for the storage portion 180 and various parts thereof according to the program. Communication with other devices by the communication portion 110 is performed by the interface 740 having a communication function and operating according to the control of the CPU 710. The display of images by the display portion 120 is performed by the interface 740 being equipped with a display portion and displaying various images according to the control of the CPU 710. Reception of user operations by the operation input portion 130 is performed by the interface 740 being equipped with an input device and receiving user operations according to the control of the CPU 710.

When the learning device 102 is implemented in the computer 700, the operations of the processing portion 170 and the various parts thereof are stored in the auxiliary storage device 730 in the form of a program. The CPU 710 reads the program from the auxiliary storage device 730, deploys it in the main storage device 720, and executes the above processing according to the program.

The CPU 710 also reserves storage space in the main storage device 720 for the storage portion 180 and various parts thereof according to the program. Communication with other devices by the communication portion 110 is performed by the interface 740 having a communication function and operating according to the control of the CPU 710. The display of images by the display portion 120 is performed by the interface 740 being equipped with a display portion and displaying various images according to the control of the CPU 710. Reception of user operations by the operation input portion 130 is performed by the interface 740 being equipped with an input device and receiving user operations according to the control of the CPU 710.

When the learning device 300 is implemented in the computer 700, the operations of the processing portion 390 and the various parts thereof are stored in the auxiliary storage device 730 in the form of a program. The CPU 710 reads the program from the auxiliary storage device 730, deploys it in the main storage device 720, and executes the above processing according to the program.

The CPU 710 also reserves storage space in the main storage device 720 for the storage portion 180 and various parts thereof according to the program. Communication with other devices by the communication portion 110 is performed by the interface 740 having a communication function and operating according to the control of the CPU 710. The display of images by the display portion 120 is performed by the interface 740 being equipped with a display portion and displaying various images according to the control of the CPU 710. Reception of user operations by the operation input portion 130 is performed by the interface 740 being equipped with an input device and receiving user operations according to the control of the CPU 710.

When the learning device 400 is implemented in the computer 700, the operations of the processing portion 490 and the various parts thereof are stored in the auxiliary storage device 730 in the form of a program. The CPU 710 reads the program from the auxiliary storage device 730, deploys it in the main storage device 720, and executes the above processing according to the program.

The CPU 710 also reserves storage space in the main storage device 720 for the storage portion 180 and various parts thereof according to the program. Communication with other devices by the communication portion 110 is performed by the interface 740 having a communication function and operating according to the control of the CPU 710. The display of images by the display portion 120 is performed by the interface 740 being equipped with a display portion and displaying various images according to the control of the CPU 710. Reception of user operations by the operation input portion 130 is performed by the interface 740 being equipped with an input device and receiving user operations according to the control of the CPU 710.

When the estimation device 500 is implemented in the computer 700, the operations of the processing portion 590 and the various parts thereof are stored in the auxiliary storage device 730 in the form of a program. The CPU 710 reads the program from the auxiliary storage device 730, deploys it in the main storage device 720, and executes the above processing according to the program.

The CPU 710 also reserves storage space in the main storage device 720 for the storage portion 580 and various parts thereof according to the program. Communication with other devices by the communication portion 110 is performed by the interface 740 having a communication function and operating according to the control of the CPU 710. The display of images by the display portion 120 is performed by the interface 740 being equipped with a display portion and displaying various images according to the control of the CPU 710. Reception of user operations by the operation input portion 130 is performed by the interface 740 being equipped with an input device and receiving user operations according to the control of the CPU 710.

When the learning device 610 is implemented in the computer 700, the operations of the data acquisition portion 611, the adversarial example acquisition portion 612, and the parameter updating portion 613 are stored in the auxiliary storage device 730 in the form of programs. The CPU 710 reads the program from the auxiliary storage device 730, deploys it in the main storage device 720, and executes the above processing according to the program.

The CPU 710 also allocates storage space in the main storage device 720 for processing by the learning device 610 according to the program. Communication between the learning device 610 and other devices is performed by the interface 740 having a communication function and operating according to the control of the CPU 710. The interaction between the learning device 610 and the user is performed by the interface 740 having an input device and an output device, presenting information to the user with the output device and receiving user operations with the input device according to the control of the CPU 710.

Any one or more of the above programs may be recorded on the nonvolatile recording medium 750. In this case, the interface 740 may read the programs from the nonvolatile recording medium 750. The CPU 710 may then directly execute the program read by the interface 740, or it may be stored once in the main storage device 720 or the auxiliary storage device 730 and then executed.

A program for executing all or some of the processes performed by the learning device 101, the learning device 102, the learning device 300, the learning device 400, the estimation device 500, and the learning device 610 may be recorded on a computer-readable recording medium, and by reading the program recorded on this recording medium into a computer and executing it, the processing of each portion may be performed. The term "computer system" here shall include an operating system (OS) and hardware such as peripheral devices.

In addition, "computer-readable recording medium" means a portable medium such as a flexible disk, magneto-optical disk, Read Only Memory (ROM), Compact Disc Read Only Memory (CD-ROM), or other storage device such as a hard disk built into a computer system. The aforementioned program may be used to realize some of the aforementioned functions, and may also be used to realize the aforementioned functions in combination with a program already recorded in the computer system.

While preferred example embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

Some or all of the above example embodiments may also be described as, but not limited to, the following supplementary notes.

(Supplementary Note 1)

A learning device comprising:

a data acquisition means that acquires a base data group, which is a group including a plurality of data;

an adversarial example acquisition means that, for each condition of adversarial example generation, uses the data included in the base data group to acquire an adversarial data group, which is a group that includes two or more adversarial examples generated under that condition; and a parameter updating means that, for a neural network that includes a partial network, a normalization layer associated with the entire base data group, and a normalization layer associated with each condition of adversarial example generation, each of these normalization layers normalizing the data input to the normalization layer itself using an average value and a variance value set for each normalization layer, uses the base data group to update a parameter value of the partial network and a parameter value of the normalization layer associated with the entire base data group, and uses each adversarial data group to update the parameter value of the partial network and the parameter value of the normalization layer associated with the condition under which the adversarial example included in that adversarial data group was generated.

(Supplementary Note 2)

The learning device according to Supplementary Note 1, wherein the conditions for generating the adversarial example include the number of target classes of the adversarial example.

(Supplementary Note 3)

The learning device according to Supplementary Note 1 or 2, further comprising an error induction determination means that, when data is input to the neural network, determines whether the data induces an error in estimation using the neural network, wherein the parameter updating means, for each adversarial data group, uses the adversarial example determined to induce an error in estimation using the neural network among the adversarial examples included in the adversarial data group to update the parameter value of the partial network and the parameter value of the normalization layer associated with the condition under which the adversarial example included in that adversarial data group was generated.

(Supplementary Note 4)

The learning device according to Supplementary Note 3, wherein the neural network receives data input and classifies the data into classes, and the error induction determination means determines that an adversarial example induces an error in estimation using the neural network if the neural network classifies the input adversarial example into a class different from the class that is considered the correct class for that adversarial example.

(Supplementary Note 5)

The learning device according to Supplementary Note 3, wherein the neural network receives data input and classifies the data into classes, and the error induction determination means determines that an adversarial example induces an error in estimation using the neural network if the neural network classifies the input adversarial example into a class that is considered the target class of that adversarial example.

(Supplementary Note 6)

The learning device according to Supplementary Note 3, wherein the neural network receives data input and extracts a feature of the data, and the error induction determination means determines that an adversarial example induces an error in estimation using the neural network if the neural network calculates the similarity between the feature extracted for the input adversarial example and the feature associated with the target class of the adversarial example, and the calculated similarity indicates a similarity equal to or greater than a predetermined threshold value.

(Supplementary Note 7)

The learning device according to any one of Supplementary Notes 1 to 6, wherein the adversarial example acquisition means generates an adversarial example that has any of the classes other than the correct class of the base data as a target class based on the similarity between the feature of the base data, which is data included in the base data group, and the feature associated with a class other than the correct class of the base data.

(Supplementary Note 8)

A learning method comprises a computer:

acquiring a base data group, which is a group including a plurality of data;

using, for each condition of adversarial example generation, data included in the base data group to acquire an adversarial data group, which is a group that includes two or more adversarial examples generated under that condition; and for a neural network that includes a partial network, a normalization layer associated with the entire base data group, and a normalization layer associated with each condition of the generation of the adversarial example, each of these normalization layers normalizing the data input to the normalization layer itself using an average value and a variance value set for each normalization layer, using the base data group to update a parameter value of the partial network and a parameter value of the normalization layer associated with the entire base data group, and using each adversarial data group to update the parameter value of the partial network and the parameter value of the normalization layer associated with the condition under which the adversarial example in that adversarial data group was generated.

(Supplementary Note 9)

A program for causing a computer to execute:

acquiring a base data group, which is a group containing a plurality of data;

using, for each condition of adversarial example generation, data included in the base data group to acquire an adversarial data group, which is a group that includes two or more adversarial examples generated under that condition; and for a neural network that includes a partial network, a normalization layer associated with the entire base data group, and a normalization layer associated with each condition of the generation of the adversarial example, each of these normalization layers normalizing the data input to the normalization layer itself using an average value and a variance value set for each normalization layer, using the base data group to update a parameter value of the partial network and a parameter value of the normalization layer associated with the entire base data group, and using each adversarial data group to update the parameter value of the partial network and the parameter value of the normalization layer associated with the condition under which the adversarial example in that adversarial data group was generated.

Note that a program may be stored in a non-transitory storage medium and be executed by a computer.

What is claimed is:

1. A learning device comprising:

at least one memory configured to store instructions; and at least one processor configured to execute the instructions to:

acquire a base data group, which is a group including a plurality of data;

for each condition of adversarial example generation, use the data included in the base data group to acquire an adversarial data group, which is a group that includes two or more adversarial examples generated under that condition; and for a neural network that includes a partial network, a normalization layer associated with the entire base data group, and a normalization layer associated with each condition of adversarial example generation, each of these normalization layers normalizing the data input to the normalization layer itself using an average value and a variance value set for each normalization layer, update a parameter value of the partial network and a parameter value of the normalization layer associated with the entire base data group by using the base data group, and update the parameter value of the partial network and the parameter value of the normalization layer associated with the condition under which the adversarial example included in that adversarial data group is generated by using each adversarial data group.

2. The learning device according to claim 1, wherein the conditions for generating the adversarial example include the number of target classes of the adversarial example.

3. The learning device according to claim 1, wherein the processor is configured to execute the instructions to, when data is input to the neural network, determine whether the data induces an error in estimation using the neural network, for each adversarial data group, use the adversarial example determined to induce an error in estimation using the neural network among the adversarial examples included in the adversarial data group to update the parameter value of the partial network and the parameter value of the normalization layer associated with the condition under which the adversarial example included in that adversarial data group is generated.

4. The learning device according to claim 3, wherein the neural network receives data input and classifies the data into classes, and it is determined that an adversarial example induces an error in estimation using the neural network if the neural network classifies the input adversarial example into a class different from the class that is considered the correct class for that adversarial example.

5. The learning device according to claim 3, wherein the neural network receives data input and classifies the data into classes, and it is determined that an adversarial example induces an error in estimation using the neural network if the neural network classifies the input adversarial example into a class that is considered the target class of that adversarial example.

6. The learning device according to claim 3, wherein the neural network receives data input and extracts a feature of the data, and it is determined that an adversarial example induces an error in estimation using the neural network if the neural network calculates the similarity between the feature extracted for the input adversarial example and the feature associated with the target class of the adversarial example, and the calculated similarity indicates a similarity equal to or greater than a predetermined threshold value.

7. The learning device according to claim 1, wherein the at least one processor is configured to generate an adversarial example that has any of the classes other than the correct class of the base data as a target class based on the similarity between the feature of the base data, which is data included in the base data group, and the feature associated with a class other than the correct class of the base data.

8. A learning method executed by a computer comprises:

acquiring a base data group, which is a group containing a plurality of data;

using, for each condition of adversarial example generation, data included in the base data group to acquire an adversarial data group, which is a group that includes two or more adversarial examples generated under that condition; and for a neural network that includes a partial network, a normalization layer associated with the entire base data group, and a normalization layer associated with each condition of the generation of the adversarial example, each of these normalization layers normalizing the data input to the normalization layer itself using an average value and a variance value set for each normalization layer, updating a parameter value of the partial network and a parameter value of the normalization layer associated with the entire base data group by using the base data group, and updating the parameter value of the partial network and the parameter value of the normalization layer associated with the condition under which the adversarial example in that adversarial data group is generated by using each adversarial data group.

9. A non-transitory storage medium storing a program for causing a computer to execute:

acquiring a base data group, which is a group containing a plurality of data;

using, for each condition of adversarial example generation, data included in the base data group to acquire an adversarial data group, which is a group that includes two or more adversarial examples generated under that condition; and for a neural network that includes a partial network, a normalization layer associated with the entire base data group, and a normalization layer associated with each condition of the generation of the adversarial example, each of these normalization layers normalizing the data input to the normalization layer itself using an average value and a variance value set for each normalization layer, updating a parameter value of the partial network and a parameter value of the normalization layer associated with the entire base data group by using the base data group, and updating the parameter value of the partial network and the parameter value of the normalization layer associated with the condition under which the adversarial example in that adversarial data group is generated by using each adversarial data group.

* * * * *